US011346987B2

(12) United States Patent
Haak et al.

(10) Patent No.: US 11,346,987 B2
(45) Date of Patent: May 31, 2022

(54) HIGH EFFICIENCY INFRARED REFLECTOR HAVING REDUCED COLOR

(71) Applicant: 3M INNOVATIVE PROPERTIES COMPANY, St. Paul, MN (US)

(72) Inventors: Christopher A. Haak, Pine Springs, MN (US); Timothy J. Nevitt, Red Wing, MN (US); Kevin M. Hamer, St. Paul, MN (US); Raghunath Padiyath, Woodbury, MN (US); Neeraj Sharma, Lake Elmo, MN (US); Gregory F. King, Minneapolis, MN (US); William C. Pettit, III, St. Paul, MN (US); Ronald K. Thery, St. Paul, MN (US); Richard Yufeng Liu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/310,542

(22) PCT Filed: Mar. 11, 2020

(86) PCT No.: PCT/IB2020/052133
§ 371 (c)(1),
(2) Date: Aug. 10, 2021

(87) PCT Pub. No.: WO2020/183384
PCT Pub. Date: Sep. 17, 2020

(65) Prior Publication Data
US 2022/0043195 A1 Feb. 10, 2022

Related U.S. Application Data

(60) Provisional application No. 62/986,219, filed on Mar. 6, 2020, provisional application No. 62/816,511, filed on Mar. 11, 2019.

(51) Int. Cl.
*G02B 5/28* (2006.01)
*G02B 5/18* (2006.01)
(Continued)

(52) U.S. Cl.
CPC ............. *G02B 5/281* (2013.01); *B32B 7/023* (2019.01); *B32B 7/12* (2013.01);
(Continued)

(58) Field of Classification Search
CPC ......... B32B 17/00–17/1099; B32B 7/00–7/14; G02B 5/208; G02B 5/281–5/282
See application file for complete search history.

(56) References Cited

U.S. PATENT DOCUMENTS 3,610,729 A   10/1971   Rogers
4,446,305 A   5/1984   Rogers et al.
(Continued)

FOREIGN PATENT DOCUMENTS

KR   10-2009-0101495   9/2009
WO   WO 99/39224   8/1999

OTHER PUBLICATIONS

PCT International Search Report from PCT/IB2020/052133, dated Jun. 29, 2020, 4 pages.
(Continued)

*Primary Examiner* — Prashant J Khatri
(74) *Attorney, Agent, or Firm* — Robert S. Moshrefzadeh

(57) ABSTRACT

Infrared reflectors are described. In particular, infrared reflectors with reduced off-axis color are described. Such infrared reflectors may be useful in laminated glass constructions, particularly for applications where the glass may be exposed to water.

20 Claims, 27 Drawing Sheets

(51) Int. Cl.
*G02B 5/00* (2006.01)
*B32B 7/12* (2006.01)
*B32B 17/10* (2006.01)
*B32B 7/023* (2019.01)

(52) U.S. Cl.
CPC .. *B32B 17/10036* (2013.01); *B32B 17/10348* (2013.01); *B32B 17/10357* (2013.01); *B32B 17/10449* (2013.01); *G02B 5/003* (2013.01); *G02B 5/1833* (2013.01); *B32B 2264/102* (2013.01); *B32B 2264/108* (2013.01); *B32B 2307/412* (2013.01); *B32B 2307/416* (2013.01); *B32B 2307/42* (2013.01); *B32B 2551/00* (2013.01)

(56) References Cited

U.S. PATENT DOCUMENTS

| | | | |
|---|---|---|---|
| 4,540,623 A | 9/1985 | Im et al. | |
| 5,103,337 A | 4/1992 | Schrenk et al. | |
| 5,360,659 A | 11/1994 | Arends et al. | |
| 5,448,404 A | 9/1995 | Schrenk et al. | |
| 5,882,774 A | 3/1999 | Jonza et al. | |
| 6,049,419 A * | 4/2000 | Wheatley | B32B 17/10018 359/359 |
| 6,368,699 B1 | 4/2002 | Gilbert | |
| 6,531,230 B1 | 3/2003 | Weber et al. | |
| 6,783,349 B2 | 8/2004 | Neavin et al. | |
| 6,797,396 B1 | 9/2004 | Liu et al. | |
| 7,104,776 B2 | 9/2006 | Merrill et al. | |
| 7,709,092 B2 | 5/2010 | Qiu et al. | |
| 7,852,560 B2 | 12/2010 | Ouderkirk et al. | |
| 9,630,384 B2 | 4/2017 | Haak et al. | |
| 2001/0008700 A1 * | 7/2001 | Jonza | G02B 5/208 428/480 |
| 2005/0207002 A1 | 9/2005 | Liu et al. | |
| 2005/0238885 A1 * | 10/2005 | Takeda | G02B 5/223 428/426 |
| 2007/0047080 A1 | 3/2007 | Stover et al. | |
| 2011/0102891 A1 | 5/2011 | Derks et al. | |
| 2013/0094088 A1 | 4/2013 | Merrill | |
| 2014/0132897 A1 | 5/2014 | Oya et al. | |
| 2016/0109628 A1 * | 4/2016 | Weber | G02B 5/208 359/352 |
| 2017/0371083 A1 | 12/2017 | Johnson et al. | |

OTHER PUBLICATIONS

MacLeod, H.A., "Thin-film optical filters", 2$^{nd}$ Edition, Macmillan Publishing Co., (1986), 5 pages.

Thelan, A., "Design of Optical Interference Filters," McGraw-Hills, Inc. (1989), 5 pages.

Weber et al. "Giant Birefringent Optics in Multilayer Polymer Mirrors", Science, vol. 287, Mar. 2000, pp. 2451-2456.

* cited by examiner

HIGH EFFICIENCY INFRARED REFLECTOR HAVING REDUCED COLOR

BACKGROUND

Infrared reflectors may be polymeric multilayer optical films formed by coextruding tens to hundreds of molten polymer layers and subsequently orienting or stretching the resulting film. These microlayers have different refractive index characteristics and sufficient thinness so that light is reflected at interfaces between adjacent microlayers. Infrared reflectors typically reflect over part of the near-infrared spectrum and may be useful for solar heat rejection applications.

SUMMARY

In one aspect, the present description relates to an infrared reflecting film. In particular, the infrared reflecting film includes a multilayer optical core having a plurality of optical repeat unit including a first birefringent polymer layer and a second polymer layer. The infrared reflecting film also includes a visible absorbing layer disposed adjacent a major surface of the multilayer optical core, the visible absorbing layer not being an adhesive layer. The plurality of optical repeat units each have an optical thickness, and the optical thicknesses of the plurality of optical repeat units are configured such that the plurality of optical repeat units exhibits a reflection band having a left bandedge and a right bandedge, each bandedge of a reflection band defined as the point nearest to the center of the reflection band, at which transmission crosses 45 percent. The reflection band shifts as a function of incidence angle and produces a maximum color shift, the maximum color shift being the largest distance, ignoring lightness, between two points in a L*a*b* color space, of reflected color, over a range of incidence angles from 0 to 85 degrees measured at 5 degree increments. At a 60 degree angle of incidence, the left bandedge is at or below 750 nm, and the maximum color shift with and through the visible absorbing layer is reduced by at least 25% compared with the maximum color shift without the visible absorbing layer.

In another aspect, the present description relates to an infrared reflecting film. The infrared reflecting film includes a multilayer optical core having a plurality of optical repeat units, each optical repeat unit including a first birefringent polymer layer and a second polymer layer, and a visible absorbing layer disposed adjacent a major surface of the multilayer optical core, the visible absorbing layer not being an adhesive layer. The plurality of optical repeat units each have an optical thickness, the optical thicknesses of the plurality of optical repeat units are configured such that the plurality of optical repeat units exhibits a reflection band having a left bandedge and a right bandedge, the reflection band shifts as a function of incidence angle, and where at a 60 degree angle of incidence, the left bandedge is at or below 750 nm. The ratio of the visible light reflection from 400 nm to 700 nm at 50° angle of incidence versus 8° angle of incidence is at least 150%.

DETAILED DESCRIPTION

Figure 1A:
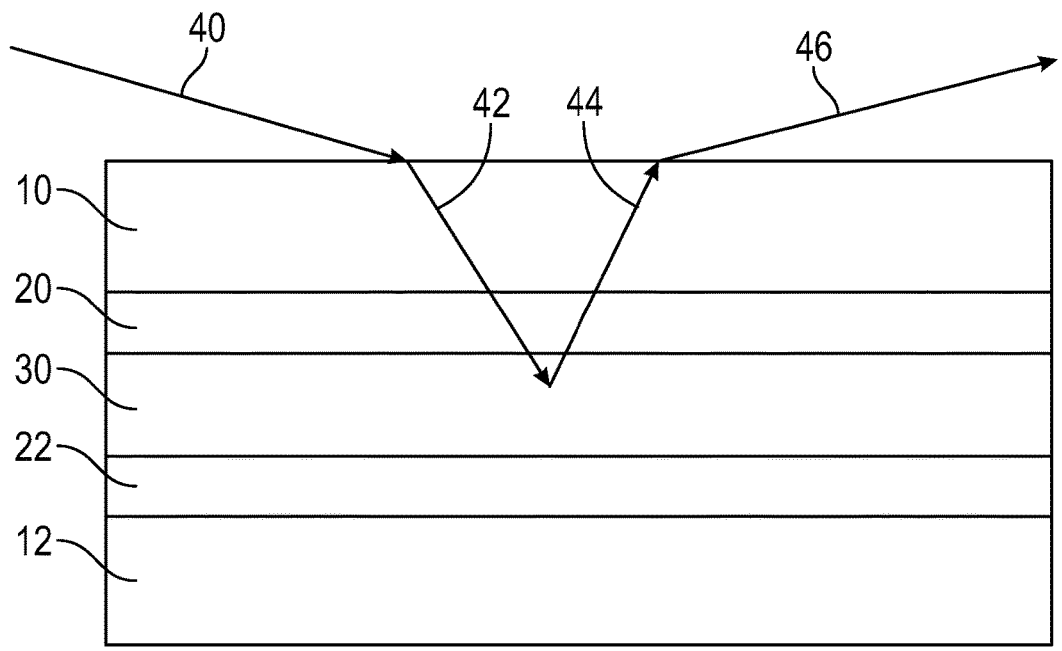
FIG. 1A is a schematic elevation cross-section of an infrared reflector laminated to glass.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters,* 2nd Ed., Macmillan Publishing Co. (1986) and by A. Thelan, *Design of Optical Interference Filters,* McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. These may be referred to as thermoplastic multilayer optical films. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or on both sides of an optical packet. In the case of a single-packet multilayer optical film, the protective boundary layer may be on one or both external surfaces of the multilayer optical film.

Packets, for the purpose of this description, are generally monotonically varying thicknesses of optical repeat units. For example, packets may be monotonically increasing, monotonically decreasing, both increasing and constant, or both decreasing and constant, but not both increasing and decreasing. One or several layers that do not follow this pattern should be understood to be nonconsequential to the overall definition or identification of a certain optical repeat layer grouping as a packet. In some embodiments, it may be helpful to define a packet as the largest discrete grouping of consecutive, non-redundant layer pairs that collectively provides reflection over a certain subrange of the spectrum of interest (e.g., the visible or the near-infrared spectrum).

In some cases, the microlayers have thicknesses and refractive index values providing a ¼-wave stack, i.e., arranged in optical repeat units or unit cells each having two adjacent microlayers of equal optical thickness (f-ratio=50%), such optical repeat unit being effective to reflect by constructive interference light whose wavelength λ is about twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients of the optical repeat units along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of a multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, optionally followed by passing the multilayer extrudate through one or more layer multiplication devices, followed by casting via a film die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, i.e., to function as a reflector, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Skin layers are sometimes added. Often this is done after layer formation but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.).

Infrared reflectors, which may be referred to as solar or sun control films or, more generally, window films, selectively reflect the near-infrared portion of the electromagnetic spectrum while transmitting the visible wavelength spectrum. This reduces the solar radiation through such a reflector while still appearing generally transparent or translucent. In a closed or semi-closed environment such as a building or vehicle, this may help reduce the temperature and the cooling load required to maintain the environment at the desired temperature. In some cases, visible light absorbers may be provided in order to reduce the visible light transmission, but such absorbers are typically selected to provide a color-neutral darkening.

It is known that the reflection band of a typical infrared reflector (or, in fact, any typical multilayer optical reflector that relies on interference between alternating microlayers) shifts left (to shorter wavelengths) with increasing incidence angle. For a detailed discussion on the shifting bandedge of multilayer optical films, see U.S. Pat. No. 6,531,230 (Weber et al.). To avoid observable off-axis reflected color, infrared reflectors are designed to have a left bandedge that does not shift leftward to the visible range at maximum light incidence angles—corresponding to about 850 nm at normal incidence. At angles of incidence less than maximum, this means that the infrared reflector is transmitting at least some of those wavelengths between the edge of the visible band and the normal incidence left bandedge of the reflector, making the infrared reflector less efficient at rejecting solar radiation.

In real-world conditions, an infrared reflector is laminated to or between glass. The index of refraction of the glass creates an interface for Fresnel reflection from air above a certain incidence angle, and provides for refraction of incident light into the infrared reflector. As such, the maximum propagation angle into the infrared reflector, regardless of the external incidence angle (onto glass) is only about 40 degrees.

However, in outdoor environments, water droplets may form on the external glass—through rain, condensation, or cleaning. These semi-spherical or hemispherical droplets provide a geometrical surface such that all incident light is essentially perpendicular to the surface and therefore minimally refracted. Further, the water droplets bridge the gap between the refractive index of air and glass, and help to couple the light in and out of the infrared reflector and glass. In such instances, the maximum angle of propagation in the infrared reflector is higher—55 degrees or more. Therefore, even carefully designed infrared reflectors may appear highly colored in the presence of water droplets, due to the unusual propagation conditions.

Designing the left bandedge to be even further rightward may help with reduced reflected color, but is undesirable in certain applications because of the loss of efficiency corresponding to the transmission of more long-visible/near-IR wavelengths.

Adding a visible light absorbing material to the infrared reflector provides a reduction in the visible reflected color under the water droplet conditions. Surprisingly, this visible light absorbing material allows for design of the reflector to be even more efficient; i.e., allows for the left bandedge to be designed closer to the edge of (or even slightly inside of) the visible wavelength band at normal and oblique incidences. Color is often objectionable not because of its absolute value, but because of the magnitude of the color shift between two different observation angles. The largest distance between two of these points may be regarded as the maximum color shift—and the quantity most important to reduce. Measured in this way, the reduction in color in both normal reflected color and in water droplet color conditions may be 25% or even 50% with and through a visible light absorbing layer, compared to the same infrared reflector without a visible light absorbing layer.

FIG. 1A is a schematic elevation cross-section of an infrared reflector laminated to glass. Infrared reflector 30 is laminated between first glass layer 10 and second glass layer 12 via first adhesive layer 20 and second adhesive layer 22. FIG. 1A illustrates the general mechanism for which the propagation angle into infrared reflector 30 is limited. Incident ray 40 is refracted once incident on first glass layer 10, as refracted ray 42 (of course, due to the difference in indices or refraction between the glass layer and air, at least some portion of light incident on the glass layer from air will be reflected due to Fresnel reflections). Refracted ray 42 passes through first adhesive layer 20 with minimal refraction (as the indices of refraction are typically quite close, the refraction is not illustrated in FIG. 1A). At some point traveling through the microlayer stack of infrared reflector 30, refracted ray 42 is reflected as reflected ray 44. Reflected ray 44 travels through the same layers—first adhesive layer and first glass layer 10, and is refracted away from normal as it travels from first glass layer 10 back to air as exit ray 46. While incident ray 40 is incident on the entire optical laminate at a relatively extreme, i.e., glancing angle, the optics of the system limit the actual, effective angle of incidence on the infrared reflector to more modest angles. To an observer, reflected-refracted ray 46 appears to have reflected off of the optical stack of FIG. 1A. at a very oblique angle; however, due to refraction into the optical system, does not exhibit color artifacts otherwise associated with such angles.

Figure 1B:
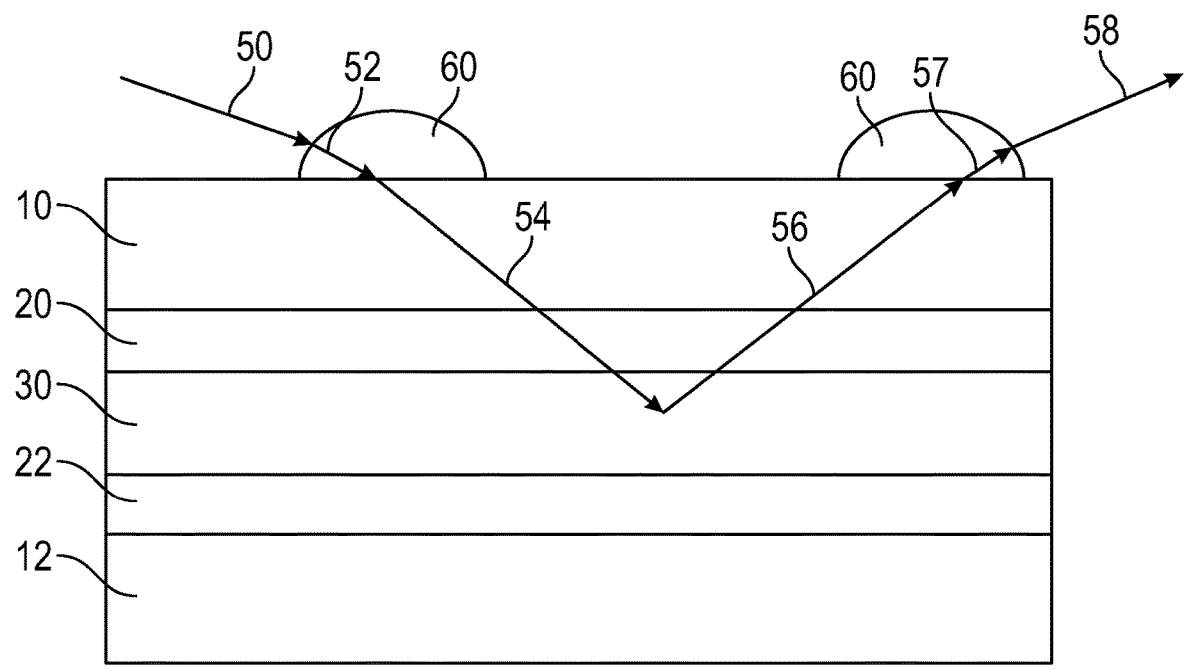
FIG. 1B is a schematic elevation cross-section of an infrared reflector laminated to glass, with water droplets on one surface.

FIG. 1B is a schematic elevation cross-section of an infrared reflector laminated to glass, with water droplets on one surface. Infrared reflector 30 is laminated between first glass layer 10 and second glass layer 12 via first adhesive layer 20 and second adhesive layer 22. Water droplets 60 are on the surface of first glass layer 10. FIG. 1B illustrates how the presence of water droplets can increase the maximum angle of incidence on infrared reflector 30. As before, incident ray 50 (corresponding to incident ray 40 in FIG. 1A) is incident on the optical laminate. However, in FIG. 1B, incident ray 50 first passes through and is refracted by the semi-spherical shape of water droplet 60. The shape and refractive index of water (between air and glass) refracts incident ray 50 into droplet ray 52 and then droplet ray 52 is further refracted after entering first glass layer 10. The shape and intermediate refractive index of the droplet may also help couple more light into the infrared reflector (instead of being reflected at the air-glass interface). Refracted ray 54 travels, as in FIG. 1A through first glass layer 10, first adhesive layer 20, and is reflected somewhere within the multilayer stack of infrared reflector 30. (Again, the interface between the glass, the adhesive layers, and the infrared reflector produce relatively insignificant refraction and are not illustrated here.) Reflected ray 56 travels back out through first adhesive layer 20 and first glass layer 10 and is refracted at the glass-water droplet interface. Reflected-droplet ray 57 travels through the rest of water droplet 60 and is refracted again at the interface between the water droplet and air as exit ray 58. Note that the vertical scale in FIG. 1B is greatly exaggerated, and that in reality, the light exits the same water droplet it enters (or at most an adjacent droplet). However, the water droplet mechanism provides for shallower incident angles on the infrared reflector, and therefore may introduce color artifacts not seen in typical conditions (i.e., the configuration of FIG. 1A).

Figure 2:
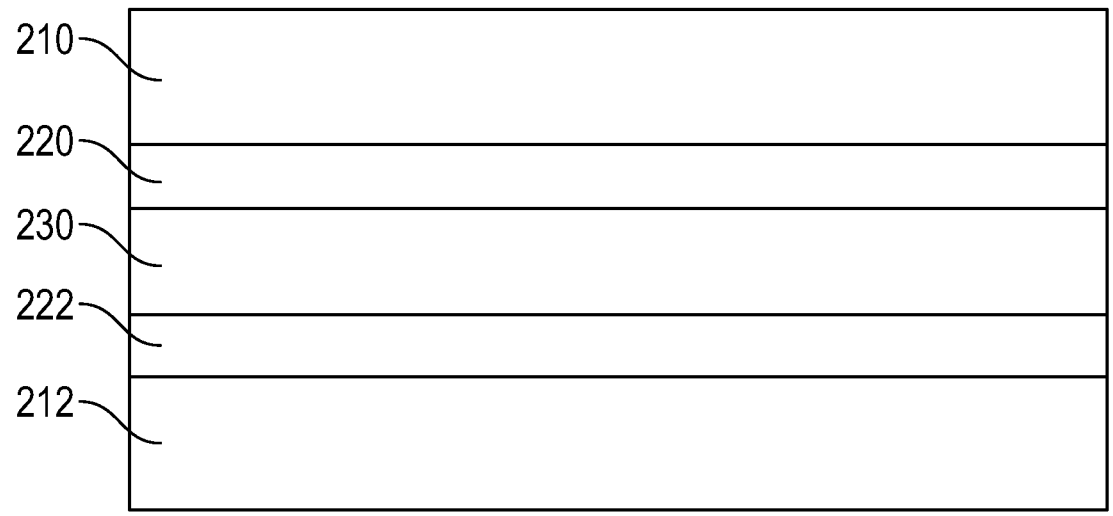
FIG. 2 is a schematic elevation cross-section of a conventional laminated stack including an infrared reflector

FIG. 2 is a schematic elevation cross-section of a conventional laminated stack including an infrared reflector. Infrared reflector 230 is laminated between first glass layer 210 and second glass layer 212 via first tinted adhesive layer 220 and second tinted adhesive layer 222. Infrared reflector may by any suitable infrared reflector that has a reflection band whose bandedge shifts with incidence angle. In many embodiments, these are birefringent interference reflectors as described above. Here, infrared reflector 230 may be assumed to be a conventional multilayer optical film infrared reflector having a left bandedge at or above 850 nm. Conventionally, visible light absorption—and by extension control of high-angle color artifacts, is controlled through the use of a light absorbing dye or pigment in first tinted adhesive layer 220, second tinted adhesive layer 222, or both. For color artifacts, the visible light absorber (e.g., the tinted adhesive layer) is typically placed between the observer and the reflector.

The conventional approach has several challenges. First, color and total visible light transmission cannot be practically evaluated until the stack is fully laminated together. And, as the visible light absorption of the tinted layer depends on both the thickness of the layer and the density of the pigment/dye in the adhesive, application of the correct thickness of adhesive and subsequent handling of a tinted adhesive layer can be challenging (and messy). Further, since the dye/pigment is present through the tinted adhesive layer, UV absorbers present in the tinted adhesive layer may not be effective to protect the dyes/pigment from UV exposure and degradation through the first glass layer.

Figure 3:
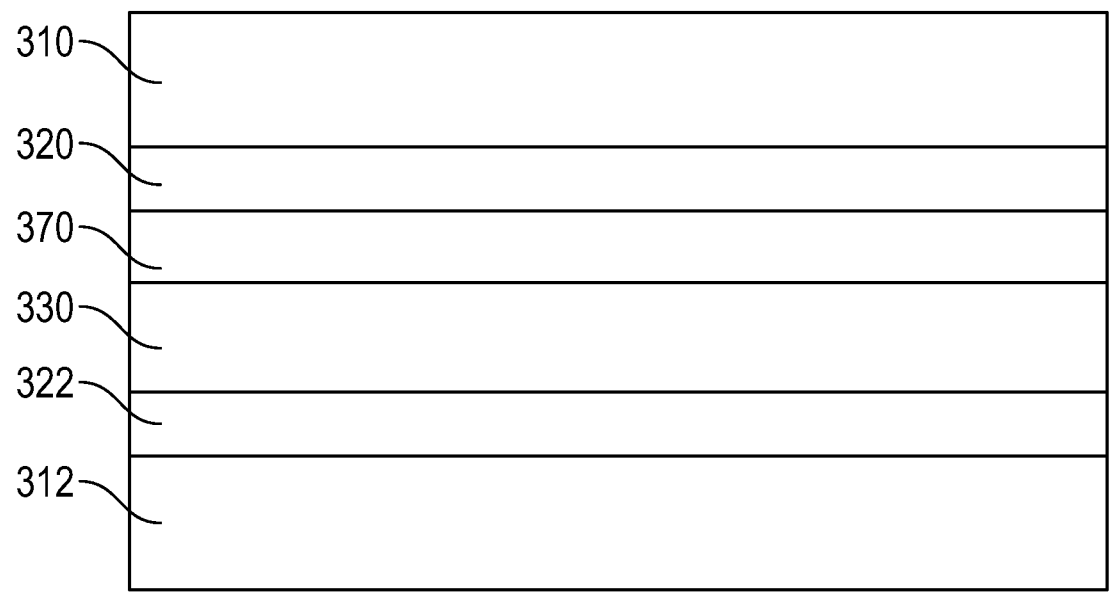
FIG. 3 is a schematic elevation cross-section of a laminated stack including an infrared reflector with a visible absorbing layer.

FIG. 3 is a schematic elevation cross-section of a laminated stack including an infrared reflector. Infrared reflector 330 including visible absorbing layer 370 is laminated between first glass layer 310 and second glass layer 312 via first optically clear adhesive layer 320 and second optically clear adhesive layer 322.

First glass layer 310 may be or include any suitable type of glass formed through any suitable method. For example, first glass layer 310 may include fused-silica glass, borosilicate glass, soda-lime glass, or any other type of glass. First glass layer 310 may be produced as plate glass, float glass, or even blown glass. First glass layer 310 may be tempered or chemically strengthened glass. First glass layer 310 may also have any suitable shape and thickness. In certain embodiments, first glass layer 310 may be several millimeters thick, up to several centimeters thick. First glass layer 310 may be substantially planar or flat, or it may have a gentle curve or contour. Other three-dimensional shapes are possible, including curves with smaller radii of curvature or even complex curvatures. First glass layer 310 may be textured or etched. First glass layer 310 may be substantially clear or color neutral, or first glass layer 310 may be a colored glass. Second glass layer 312 may be the same as first glass layer 310 or may be a different type, shape, color or thickness.

First optically clear adhesive layer 320 and second optically clear adhesive layer 322 may be any suitable optically clear adhesive and may have any suitable thickness. In some embodiments, the first and second optically clear adhesive layers may have the same thickness or they may have different thicknesses. In some embodiments, the optically clear adhesive layer may include polyvinyl butyral. In some embodiments, the optically clear adhesive layer may include ultraviolet light absorbers. In some embodiments, the optically clear adhesive layer may include hindered amine light stabilizers. The optically clear adhesive may be applied and subsequently cured by the application of heat, light, or other radiation. In some embodiments, the glass may be laminated to the infrared reflector via the optically clear adhesive with use of an autoclave. The optically clear adhesive layers may have high visible light transmission; for example, each of the optical clear adhesive layers may transmit more than 80%, 85%, 90%, or even 95% of light from 400 nm to 700 nm. The optically clear adhesive layers may also have low haze and high clarity. In some embodiments, the optically clear adhesive layers may have a haze of less than 20%, less than 15%, less than 10%, or less than 5% and/or an optical clarity of more than 80%, more than 85%, more than 90%, or more than 95%.

Infrared reflector 330 has a reflection band having a left bandedge and a right bandedge. For purposes of this description, each bandedge of a reflection band is defined as the point, nearest to the center of the reflection band, at which transmission crosses 45 percent. The left bandedge is the bandedge with the shorter (bluer) wavelength, and the right bandedge is the bandedge with the longer (redder) wavelength. Infrared reflector 330 is substantially transparent for visible wavelengths at normal incidence angles; however, at 60 degree incidence, the infrared reflector has a left bandedge at or below 750 nm. For a typical infrared reflector, this corresponds to a left bandedge at normal (0 degrees) incidence at or below 850 nm. In some embodiments, the left bandedge at normal incidence may be at or below 800 nm. In some embodiments, the left bandedge at normal incidence may be at or below 750 nm. In some embodiments, the left bandedge at normal incidence may be at or below 700 nm.

Visible light absorbing layer 370 is adjacent to infrared reflector 330; specifically, adjacent to a major surface of the multilayer optical core of infrared reflector 330. For purposes of FIG. 3, the method of attachment or the relationship between the visible light absorbing layer 370 and infrared reflector 330 is left generic; however, these configurations (including lamination, coextrusion, and visible absorbing skin layers) are explored in more detail with FIGS. 4 and 5. Visible light absorbing layer 370 may include any suitable light absorbers, including broadband light absorbers such as carbon black. In some embodiments, visible light absorbing layer 370 may include a wavelength-specific dye or pigment. In some embodiments, these may include metal oxides, such as manganese iron oxide or another transparent metal oxide. For maximum efficiency, the visible light absorber should absorb only visible range wavelengths; i.e., the infrared reflector should be relied on to reflect incoming infrared solar radiation without it being absorbed by the visible light absorbing layer (and being subsequently converted to heat); however, in practice, broadband absorbers may be suitable for many applications. These pigments may be coextruded with a polymer resin—including any suitable polymer such as polycarbonate, polyesters including polyethylene terephthalate, poly(methyl methacrylate), blends or copolymers thereof. In some embodiments, the visible light absorbing layer may be a dip-dyed polymeric resin. In some embodiments, the polymer resin may be coextruded with thermally-durable dyes, surrounded by at least two clear encapsulation layers, such as in the process described in U.S. Pat. No. 9,630,384 (Haak et al.), which is hereby incorporated by reference in its entirety.

Because its reflection band shifts as a function of incidence angle, the infrared reflector is responsible for a maximum color shift, which is the largest distance in a*b* space (ignoring L*) between two color points, measured over a range from 0 to 85 degrees in 5 degree increments. Lightness is ignored, as at high angles Fresnel reflection off of the air-film interface dominates the reflected color and confounds the color measurements. For the purposes of this description, the maximum color shift should be measured with and through the visible absorbing layer—and compared to the same construction except without the visible absorbing layer. In some embodiments—and as further shown in the Examples—visible light absorbing layers having 50% visible light transmission (VLT) may reduce the maximum color shift by more than 25%, and even more than 50% or 60%. In some embodiments, visible light absorbing layers having 20% VLT, and 5% VLT may reduce the maximum color shift by more than 90% or even 99%.

The infrared reflector described in FIG. 3, combined with the visible absorbing layer, has advantages over the conventional tinted adhesive layer because it can be more consistently produced and applied. In some cases, in-line inspection can be performed to verify that the visible light transmission and color shift are within appropriate specification. Additionally, optically clear adhesives (un-tinted) can be used which provide comparatively thickness-invariant visible light transmission. And, ultraviolet light absorbers can be provided in the adhesive layer to protect all of the visible light absorbers in the visible light absorbing layer.

Figure 4:
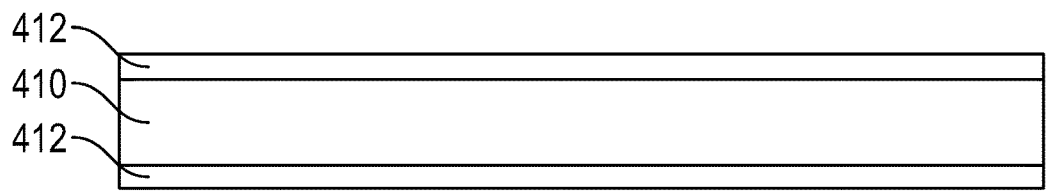
FIG. 4 is a schematic elevation cross-section of an infrared reflector including visible absorbing skin layers.

FIG. 4 is a schematic elevation cross-section of an infrared reflector including visible absorbing skin layers. Infrared reflector 410 has skin layers 412 which include a visible light absorber. FIG. 4 illustrates a first way of incorporating a visible light absorbing layer with the infrared reflector. As described above, skin layers are often coextruded along with the optically active core of a multilayer optical film, which in some embodiments are helpful to protect the optically active core from shear forces experienced during extrusion, orientation, and other manufacturing processes. Visible absorbing dyes can be extruded within skin layers. In some embodiments, these skin layers may be multilayer skin layers, such as a polyester including thermally-stable dyes surrounded clear encapsulation layers (see, e.g., U.S. Pat. No. 9,630,384 (Haak et al.)). In some embodiments only a single-side skin layer includes visible light absorbers. In some embodiments, both sides' skin layer includes visible light absorbers.

Figure 5:
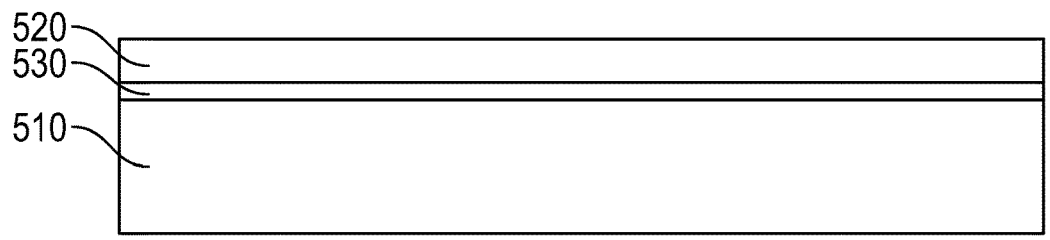
FIG. 5 is a schematic elevation cross-section of an infrared reflector with a visible light absorbing layer.

FIG. 5 is a schematic elevation cross-section of an infrared reflector with a visible light absorbing layer. Visible light absorbing layer 520 is laminated to infrared reflector 510 via adhesive 530. FIG. 5 illustrates an alternative way to configure an infrared reflector and a visible light absorbing layer. Visible light absorbing layer 520 may be produced separately via any suitable process, including any process described herein (e.g., dip-dyeing, extrusion with thermally-stable dyes and clear encapsulation layers, etc.) and subsequently laminated to a major surface of the infrared reflector via an adhesive. Adhesive 530 may be any suitable adhesive, including an optically clear adhesive or even a tinted adhesive. Adhesive 530 may be cured by the addition of radiation, heat, or any other mechanism. In some embodiments, visible light absorbing layer 520 may be laminated to infrared reflector 510 with heat and/or pressure or other appropriate conditions such that an adhesive is not needed. In some embodiments, methods from FIG. 4 and FIG. 5 may be combined such that there is a visible light absorbing skin layer and a separate visible light absorbing layer.

Constructions like those described therein may be useful in automotive glass applications, such as for sunroofs/moonroofs, windscreens, and side windows. In some embodiments, constructions described herein may be useful for architectural windows (e.g., skylights) and exterior windows in commercial and residential buildings. Constructions like those described herein may be useful in any application where solar heat rejection as well as at least partial visible light transparency may be desirable.

Highly Colored Infrared Reflecting Films

In some embodiments, it may be desirable to provide an infrared reflecting film with an intentionally highly colorful appearance. As for other infrared reflecting films described herein, the infrared reflecting film includes a multilayer optical core having a plurality of optical repeat units, each optical repeat unit including a first birefringent polymer layer and a second polymer layer, and a visible absorbing layer disposed adjacent a major surface of the multilayer optical core, the visible absorbing layer not being an adhesive layer. The plurality of optical repeat units each have an optical thickness, the optical thicknesses of the plurality of optical repeat units are configured such that the plurality of optical repeat units exhibits a reflection band having a left bandedge and a right bandedge, the reflection band shifts as a function of incidence angle, and where at a 60 degree angle of incidence, the left bandedge is at or below 750 nm.

In some embodiments, it may be desirable to have a large ratio between off-axis reflection and on-axis reflection. In this way, such constructions may have an inconspicuous appearance when viewed on axis, but a striking aesthetic when viewed at an angle. The ratio of visible light reflection from 400 nm to 700 nm at 50° angle of incidence versus 8° angle of incidence is at least 100%. In some embodiments, the ratio of visible light reflection from 400 nm to 700 nm at 50° angle of incidence versus 8° angle of incidence is at least 150%. In some embodiments, the ratio of visible light reflection from 400 nm to 700 nm at 50° angle of incidence versus 8° angle of incidence is at least 200%. In some embodiments, the ratio of visible light reflection from 400 nm to 700 nm at 50° angle of incidence versus 8° angle of incidence is at least 300%. Note that this ratio of reflections includes surface (Fresnel) reflections based on the index of refraction difference between air and the plastic outermost layer of the multilayer film. Including surface reflections in the calculation normalizes to what a viewer would see as on-axis reflection in a typical environment.

Such infrared reflecting films may include a visible absorbing layer on one side of the film. The visible absorbing layer which may include a pigment such as carbon black, may be configured such that, in application, it is on the interior facing side of the window. For an observer inside a vehicle or a building, this may mute or eliminate the magnitude of the color shift, while still preserving the distinct aesthetic effect for exterior observers. In some embodiments, a protective hardcoat is provided on an exterior or exposed surface of an infrared reflecting film.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

EXAMPLES

Infrared reflectors as described in U.S. Pat. No. 6,797,396, Example 5 were made. The left bandedge of reflection of the film was adjusted to 850 to 700 nanometers with a right bandedge of reflection of approximately 1160 nanometers. The films were made, modeled, and/or tested, and the test method and modeling are described below. The targeted modeled tinting layer was based on layer made with a commercial dispersion of manganese ferrite black spinel available as WRF-30X1 from Sumitomo Metal Mining Company (Tokyo, Japan). This dispersion was mixed into a solvent based coating consisting of PVB resin (Mowitol B20H, available from Kuraray Company, Tokyo, Japan). The coating solution consisted of 8-30 wt. % WRF-30X1, 5-12 wt. % of the Mowitol B20H and the remainder of a solvent blend of methylethyl ketone, toluene, heptane, and methylisobutyl ketone. The coating was dried to obtain the targeted dispersion in the PVB resin coated onto the above-referenced infrared reflectors. The percentage of the WEF-30X1 in the coating solution was adjusted to obtain the visible light transmission as noted in the examples.

Test Method

The reflection spectra of the films were measured in a PerkinElmer LAMBDA 1050 spectrometer (Watham, Mass.) using a Total Absolute Measurement System (TAMS) accessory module (model #L6310240) which allows for automatic rotation and measurement of the sample for measuring off angle reflectance. Color values were then calculated for each off angle measured spectra and are reported below. All color values are measured using a D65 light source.

Modeling

The reflected spectra/color values were obtained from an optical model of the reflected color. An optical film stack was mathematically described, consisting of a polymeric multilayer construction, wherein each 1-d layer of material A, (PET) is interdigitated with an alternating 1-d layer of material B (CoPMMA). The phase thickness of the $1^{st}$ A/B layer pair, is prescribed as $½\lambda_0$ (wavelength), wherein $\lambda_0$ is generally near 850 nm. Adjacent A/B layer pairs have their physical thicknesses adjusted to have a phase thickness of $½\lambda_i$, where $\lambda_i$ is incrementally larger than $\lambda$. Further adjoining A/B layer pairs have their phase thickness adjusted to be $½\lambda_{i+1}$ and so on up through the entire optical film stack, until the last A/B layer pair is reached, with a phase thickness that is $½\lambda_n$ where $\lambda_n$ is approximately 1160 nm. For all the computational examples, the films stack consisted of 112 A/B layer pairs, in a monotonic, linear A/B layer pair thickness profile. In addition, within each A/B layer pair, both the A layer and B layer have an individual phase thickness that is $¼\lambda_i$, creating a so called quarter-wave configuration. Such a configuration of an interference structure as described above forms resonant reflection bands at only the odd-ordered harmonics. The refractive index values that are appropriate to a biaxially stretched PET (A) and an amorphous CoPMMA (B) are shown in Table 1 below. The refractive index values that are used to computationally form the optical film stack and its associated phase thickness, are those under the 633 nm wavelength column of Table 1. Other examples may have a film stack structure where $\lambda_0$ is approximately equal to 800 nm, or approximately equal to 700 nm. Atop the optical film stack with 112 A/B layer pairs, in the direction facing the incident light, an absorbing layer (that is absorbing in visible wavelengths) can be computationally placed. The real and imaginary parts of the refractive index for this absorbing layer are also shown in Table 1.

TABLE 1

Refractive index values for modeling.

| | Wavelength | | |
|---|---|---|---|
| | 450 nm | 550 nm | 633 nm |
| PET | | | |
| Nx | 1.6811 | 1.6584 | 1.6473 |
| Ny | 1.6811 | 1.6584 | 1.6473 |
| Nz | 1.5229 | 1.5113 | 1.5069 |
| CoPMMA | | | |
| Niso | 1.5057 | 1.4974 | 1.4936 |
| SMM Spinel | | | |
| Niso | 1.5057 | 1.4974 | 1.4936 |
| Kiso | 0.01035 | 0.01267 | .01377 |

A 4×4 transfer matrix solver for a 1-d biaxial material film stack was employed to solve for the reflection and transmission coefficients of the film stack structure, with and without the incident light-facing absorbing layer. These reflection and transmission coefficients are determined for any arbitrary set of light incident angles θ, and azimuth angles φ, across an arbitrary range of wavelengths λ. The reflection and transmission coefficients can then be normalized to the intensity spectrum of the incident light. For these examples the incident light intensity spectrum is taken to be a D65 intensity spectrum. Reflected color and transmitted color chromaticity coordinates can then be calculated to provide a perceived color, for reflected light and transmitted light.

Reflected spectra/color values were also obtained from an optical model of the reflected color with a hemispherical coupling at the surface of the film (raindrop effect). Hemispherical coupling at the surface was modeled using the same model for the regular reflected color, except in this case, the incident light entered into the surface through a liquid water droplet. The refractive index used for this liquid water drop was 1.34. So, the net difference between the regular reflected color and the hemispherical coupling case is that in the regular reflected color, the light entering the film, or coated film comes from air with a refractive index of 1.0 as opposed to coming from water with a refractive index of 1.34. The higher refractive index of the water results in less refraction as the incident light enters the film and hence it is able to enter at a higher angle than without the hemispherical coupling. See generally FIG. 1B and accompanying description.

Figure 6:
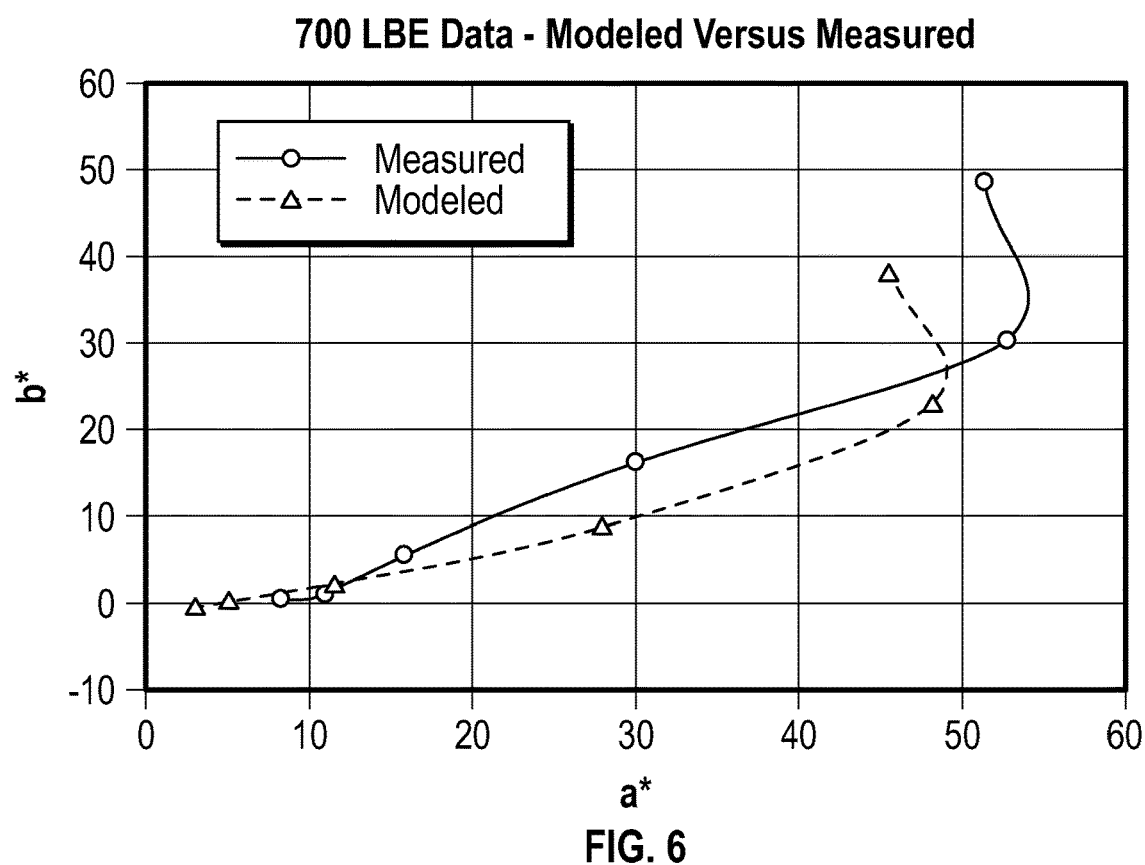
FIG. 6 is a comparison of reflected color for a modeled and measured 700 nm left bandedge infrared reflector.

A film with a 700 nm left bandedge was used to test the validity of the modeling because it produces the most off-angle reflected color of any of the plain film examples that are able to be measured (due to the limitations of equipment, films with raindrops on them are not able to be reliably measured). The measured and modeled reflected color from the uncoated 700 LBE film show both good qualitative and quantitative agreement in the reflected color at points 10 degrees apart from 10 degrees to 60 degrees, shown in FIG. 6. The offset in the data is easily explained by the fact that, due to real-world manufacturing error, the properties of the real film did not match perfectly with the expected, modeled film. However, both show a similar slope of color change with angle and the same increase in b* and subsequent decrease in a* at high angles. Therefore, the models can be relied on to be instructive for both the magnitude and direction of color shifts as a function of incidence angle, even if not for the precise color values.

For the purposes of these examples, the maximum color shift was calculated as the maximum span, or linear distance between any two a* b* points on the color plot obtained from the modeled reflected color from 0 degrees up to 85 degrees. L* was ignored because of the large amount of statistical noise in this data at high angles. This distance is calculated as the square root of the sum of differences in a* and b* squared.

$$\sqrt{(a1-a2)^2 + (b1-b2)^2}$$

where a1, b1 and a2, b2 are any pairs of modeled color.

The % color reduction is calculated as the maximum color shift for the uncoated film–the maximum color shift for the coated film divided by the maximum color shift for the uncoated film. Where, in each case the uncoated film has the same corresponding LBE as the coated film. These calculations were done for both the reflection with and without the hemispherical coupling (raindrop).

TABLE 2

Modeled spectra for comparative examples and reduced maximum color shift for examples.

Figure 7:
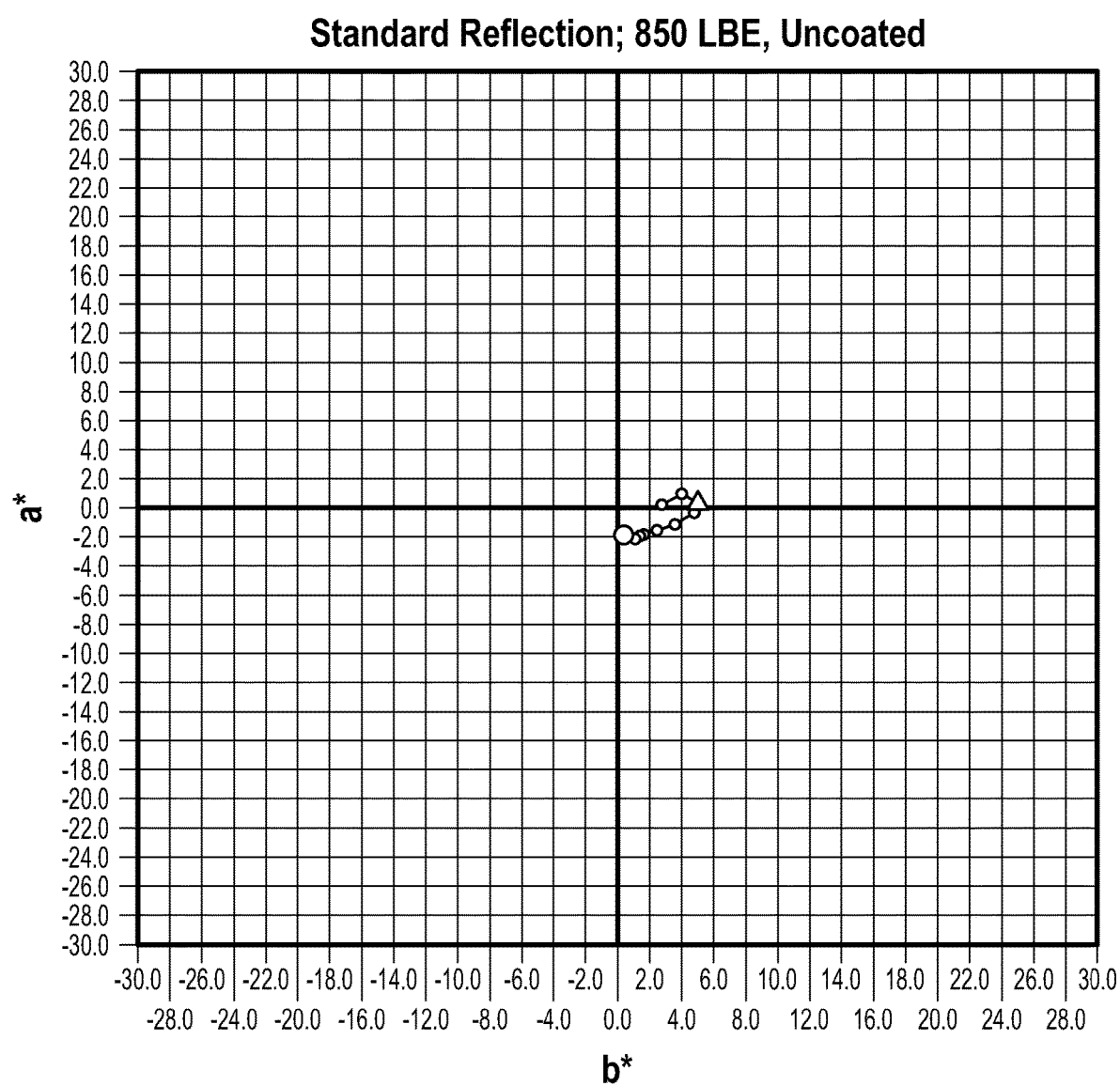
FIG. 7 is a graph showing a*b* reflected color from 0 to 85 degrees in 5 degree increments for a modeled 850 nm left bandedge infrared reflector, uncoated, under standard reflection conditions.
Figure 8:
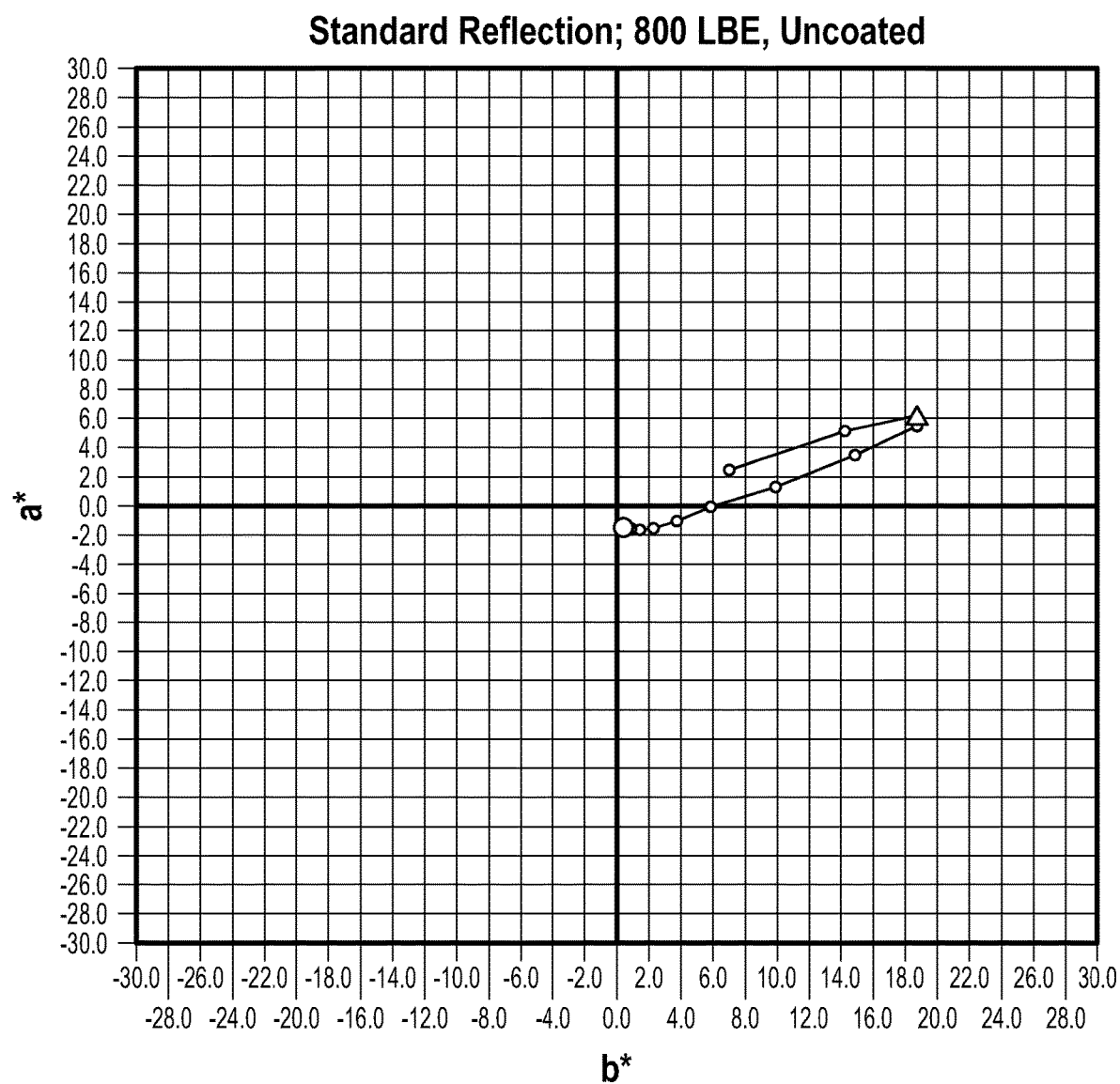
FIG. 8 is a graph showing a*b* reflected color from 0 to 85 degrees in 5 degree increments for a modeled 800 nm left bandedge infrared reflector, uncoated, under standard reflection conditions.
Figure 9:
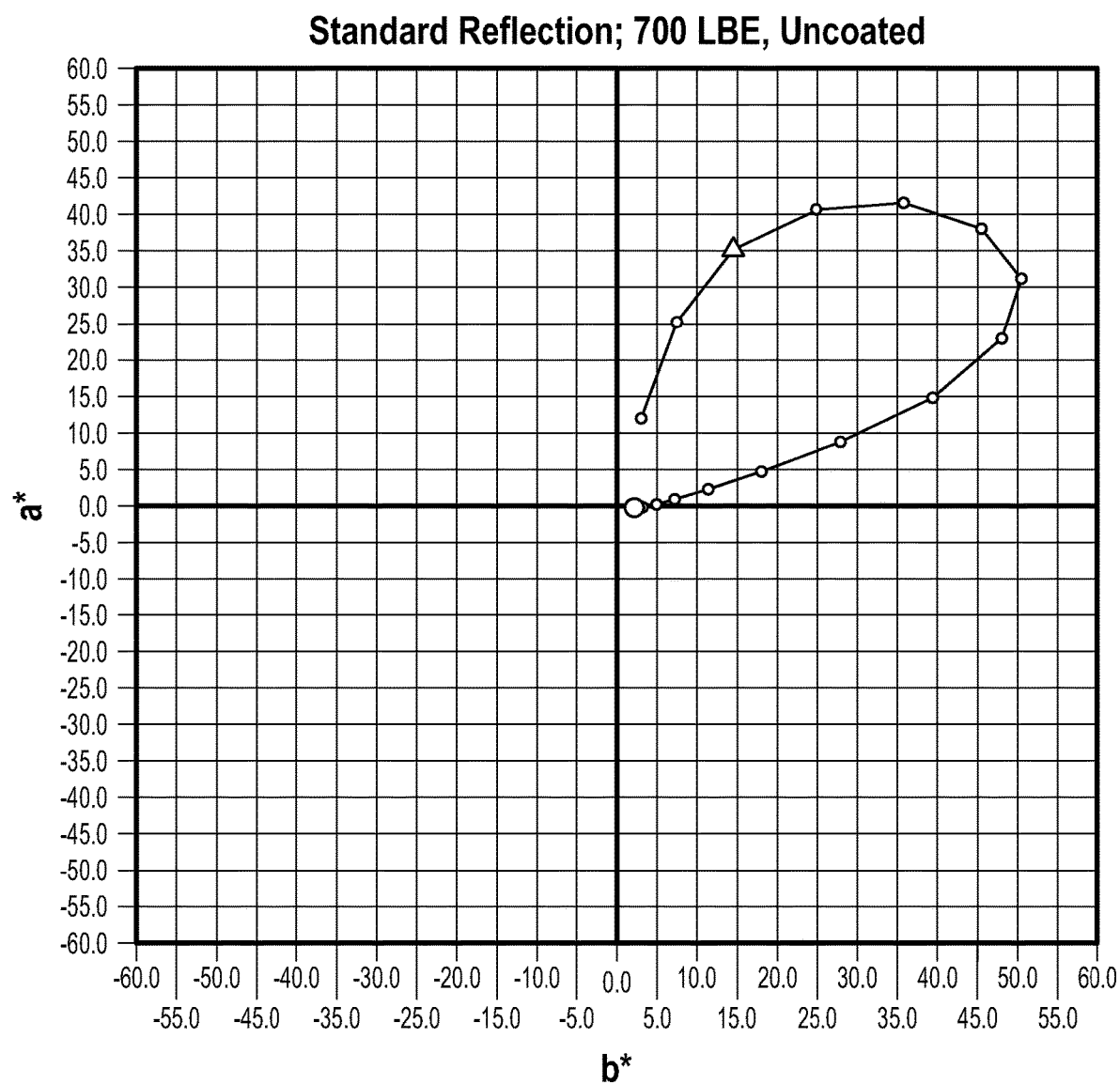
FIG. 9 is a graph showing a*b* reflected color from 0 to 85 degrees in 5 degree increments for a modeled 700 nm left bandedge infrared reflector, uncoated, under standard reflection conditions.
Figure 10:
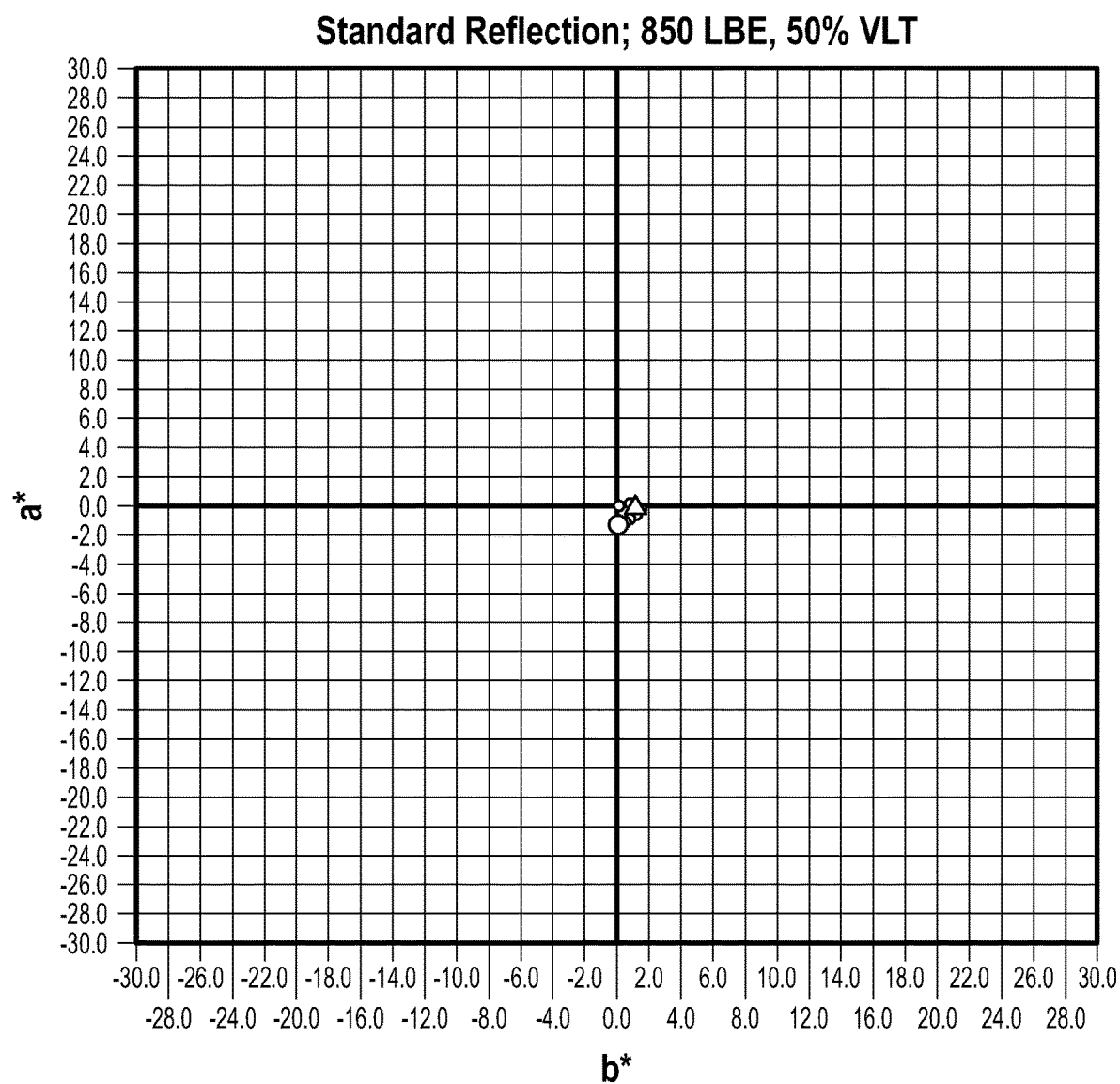
FIG. 10 is a graph showing a*b* reflected color from 0 to 85 degrees in 5 degree increments for a modeled 850 nm left bandedge infrared reflector, with a 50% visible light transmission (VLT) absorbing layer, under standard reflection conditions.
Figure 11:
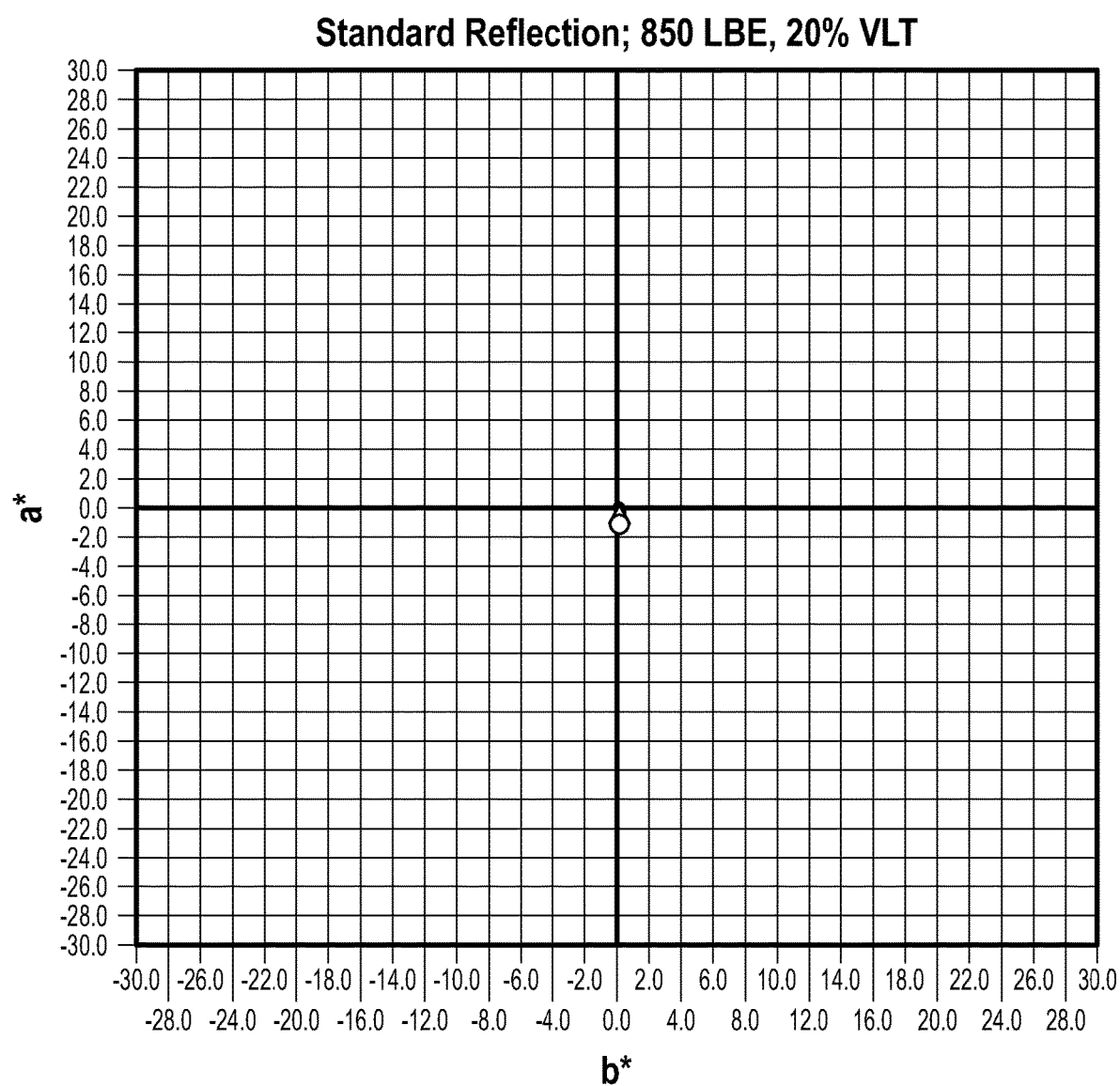
FIG. 11 is a graph showing a*b* reflected color from 0 to 85 degrees in 5 degree increments for a modeled 850 nm left bandedge infrared reflector, with a 20% VLT absorbing layer, under standard reflection conditions.
Figure 12:
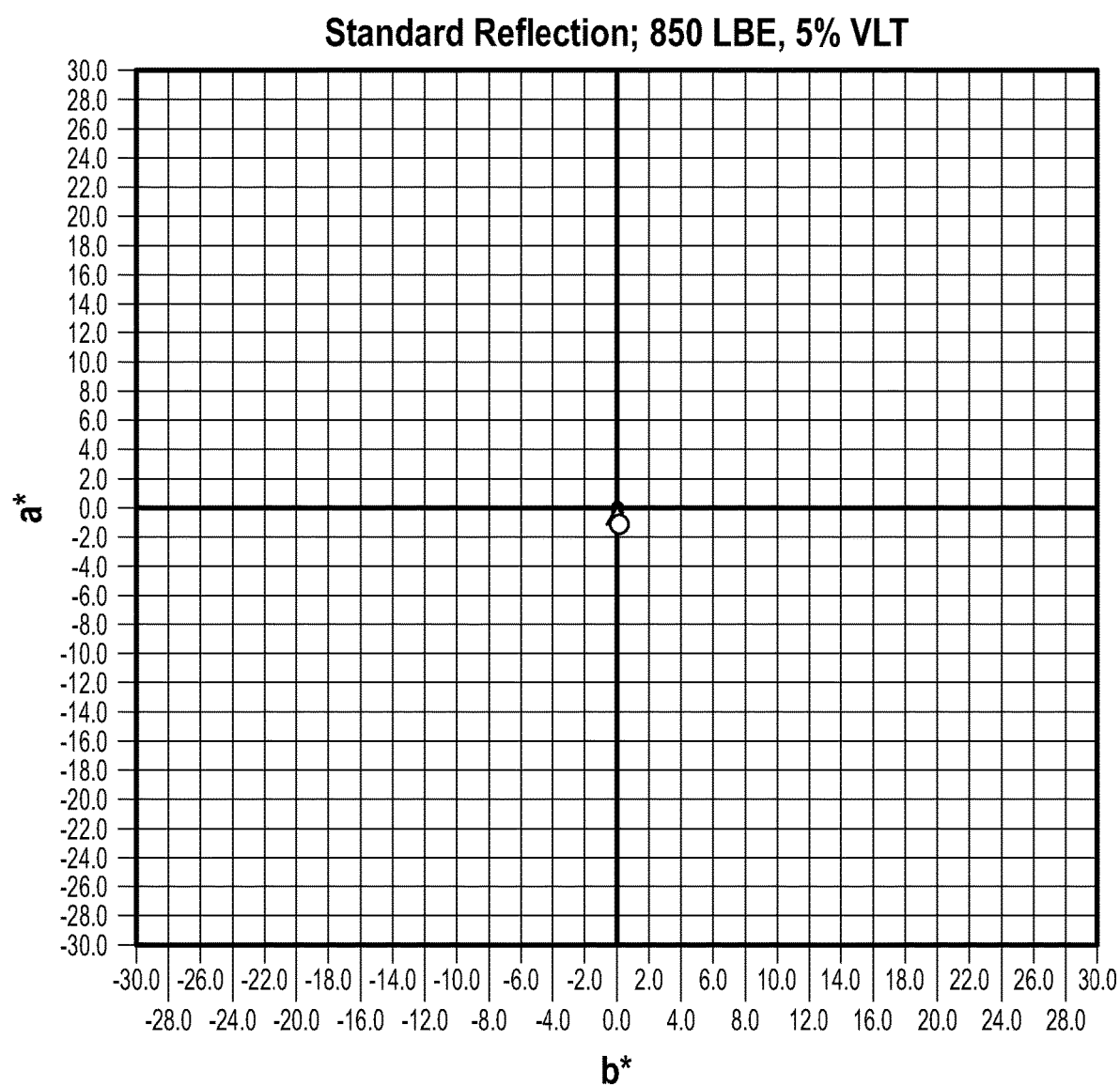
FIG. 12 is a graph showing a*b* reflected color from 0 to 85 degrees in 5 degree increments for a modeled 850 nm left bandedge infrared reflector, with a 5% VLT absorbing layer, under standard reflection conditions.
Figure 13:
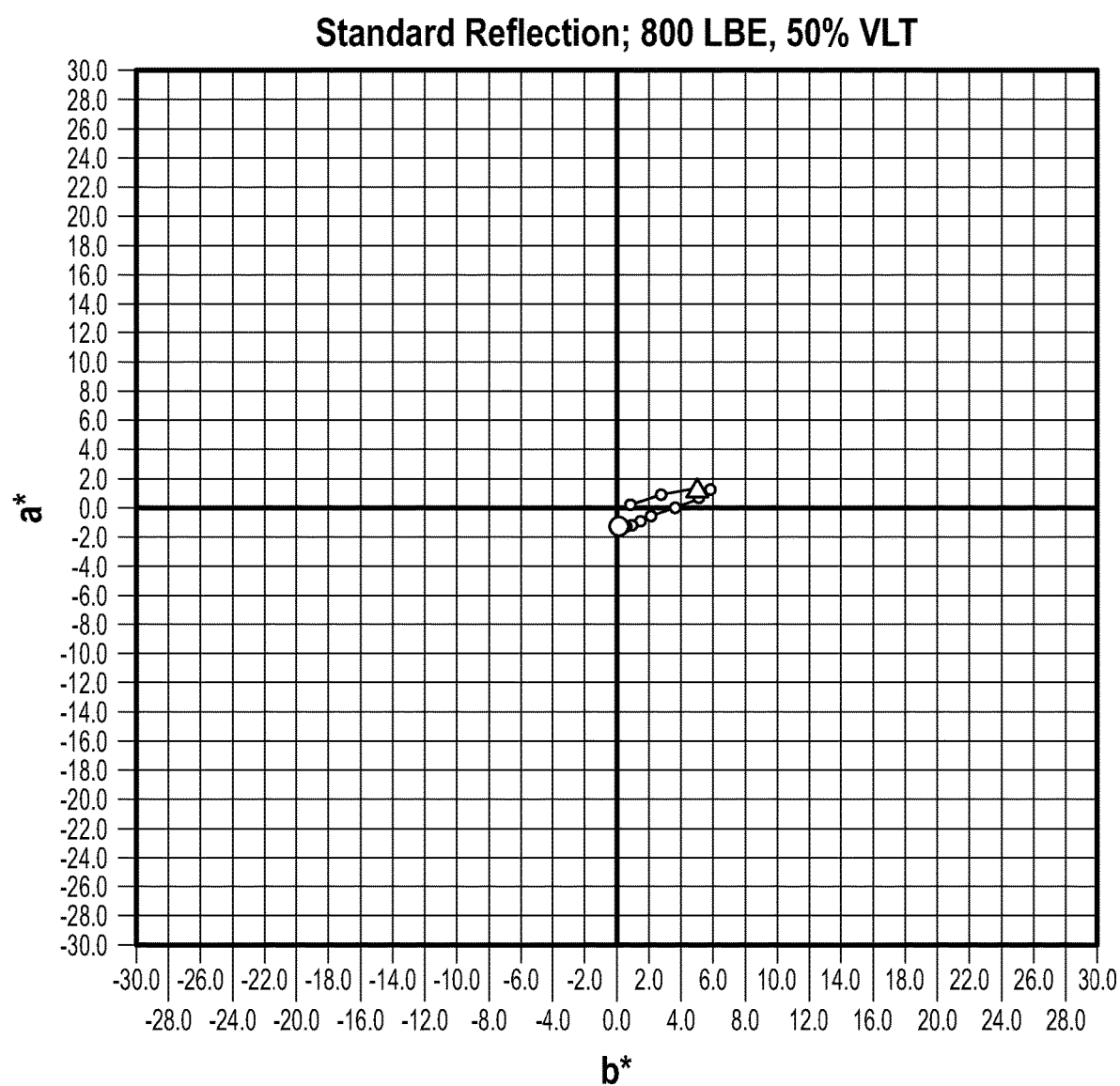
FIG. 13 is a graph showing a*b* reflected color from 0 to 85 degrees in 5 degree increments for a modeled 800 nm left bandedge infrared reflector, with a 50% VLT absorbing layer, under standard reflection conditions.
Figure 14:
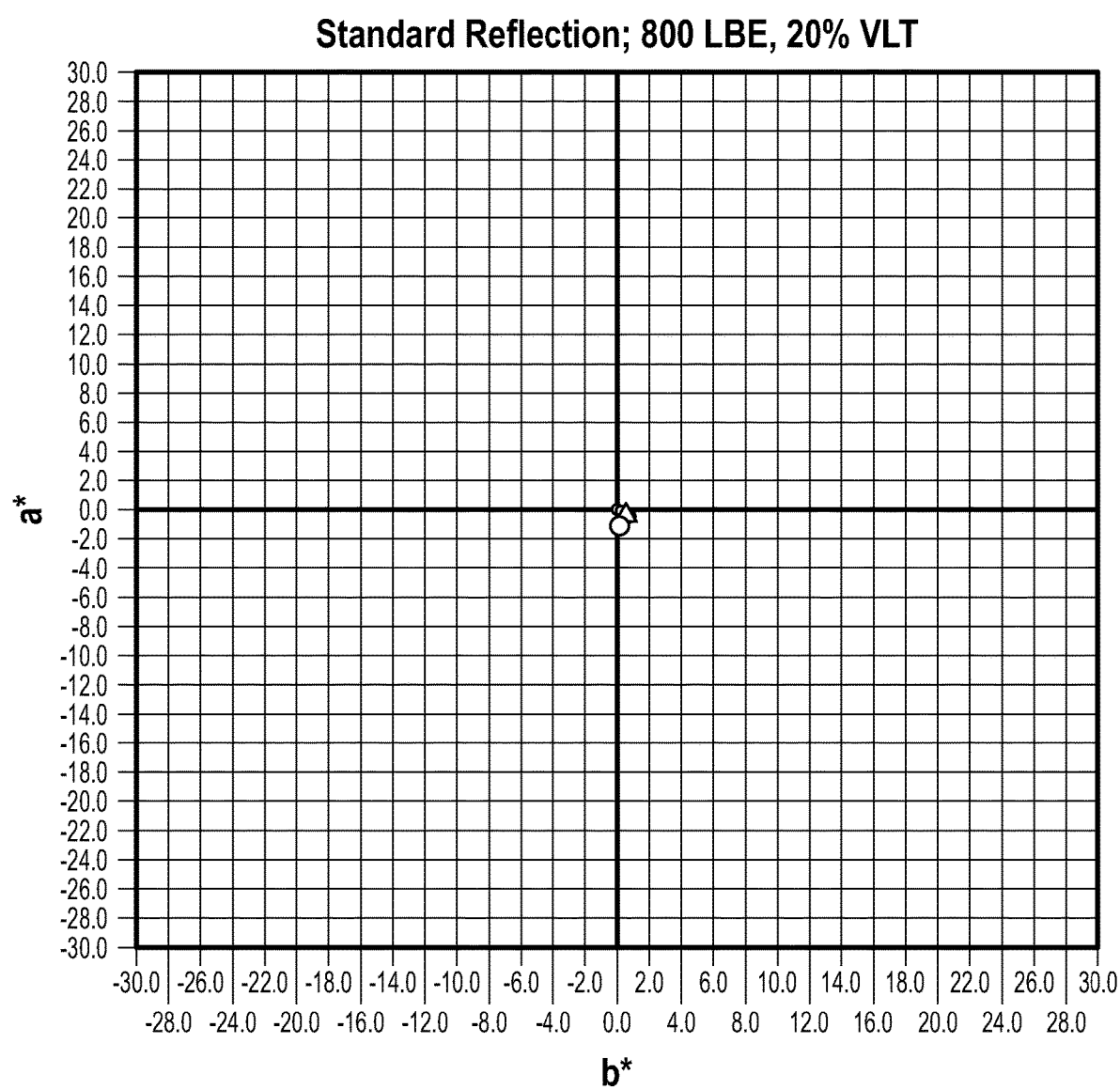
FIG. 14 is a graph showing a*b* reflected color from 0 to 85 degrees in 5 degree increments for a modeled 800 nm left bandedge infrared reflector, with a 20% VLT absorbing layer, under standard reflection conditions.
Figure 15:
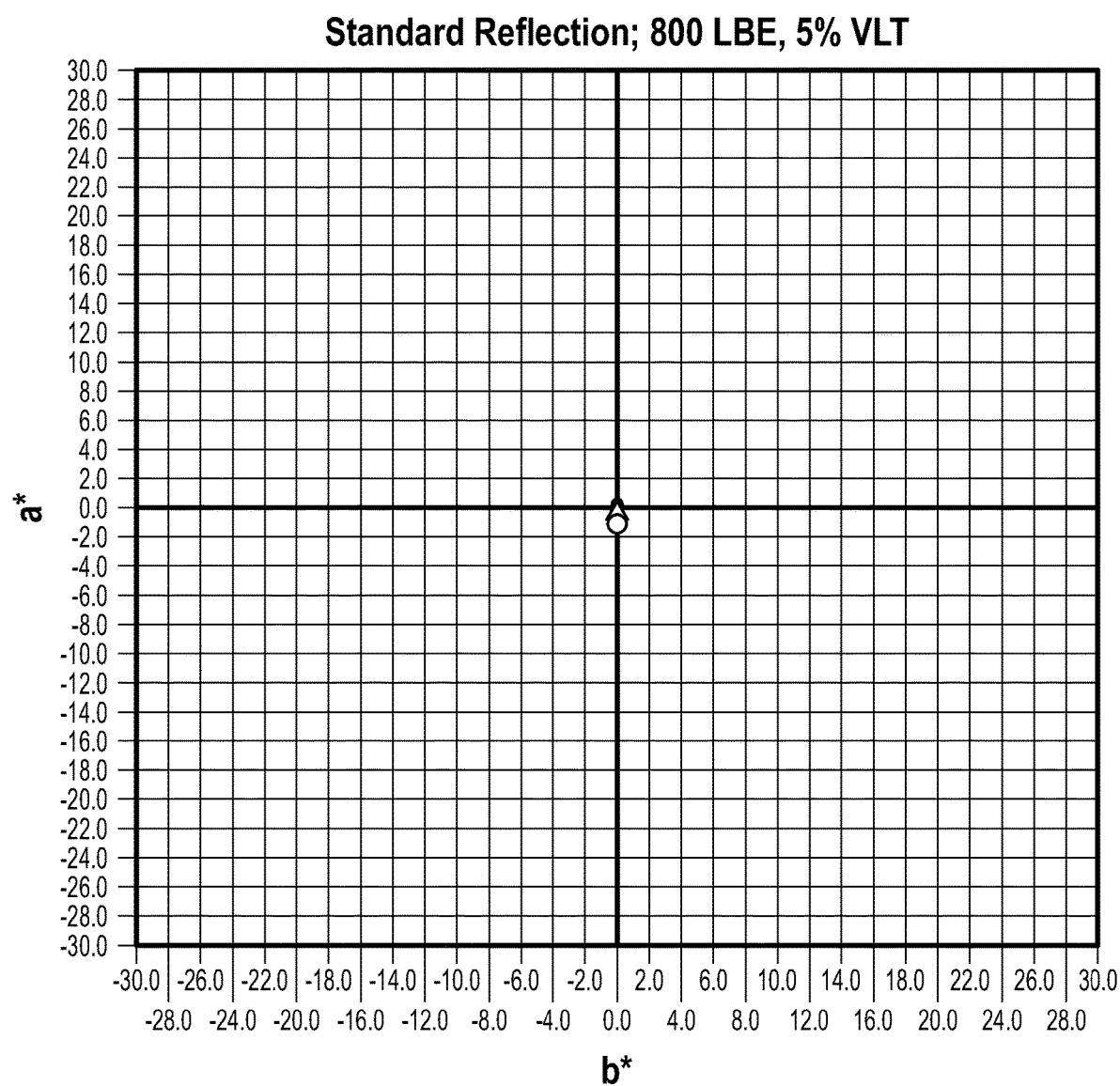
FIG. 15 is a graph showing a*b* reflected color from 0 to 85 degrees in 5 degree increments for a modeled 800 nm left bandedge infrared reflector, with a 5% VLT absorbing layer, under standard reflection conditions.
Figure 16:
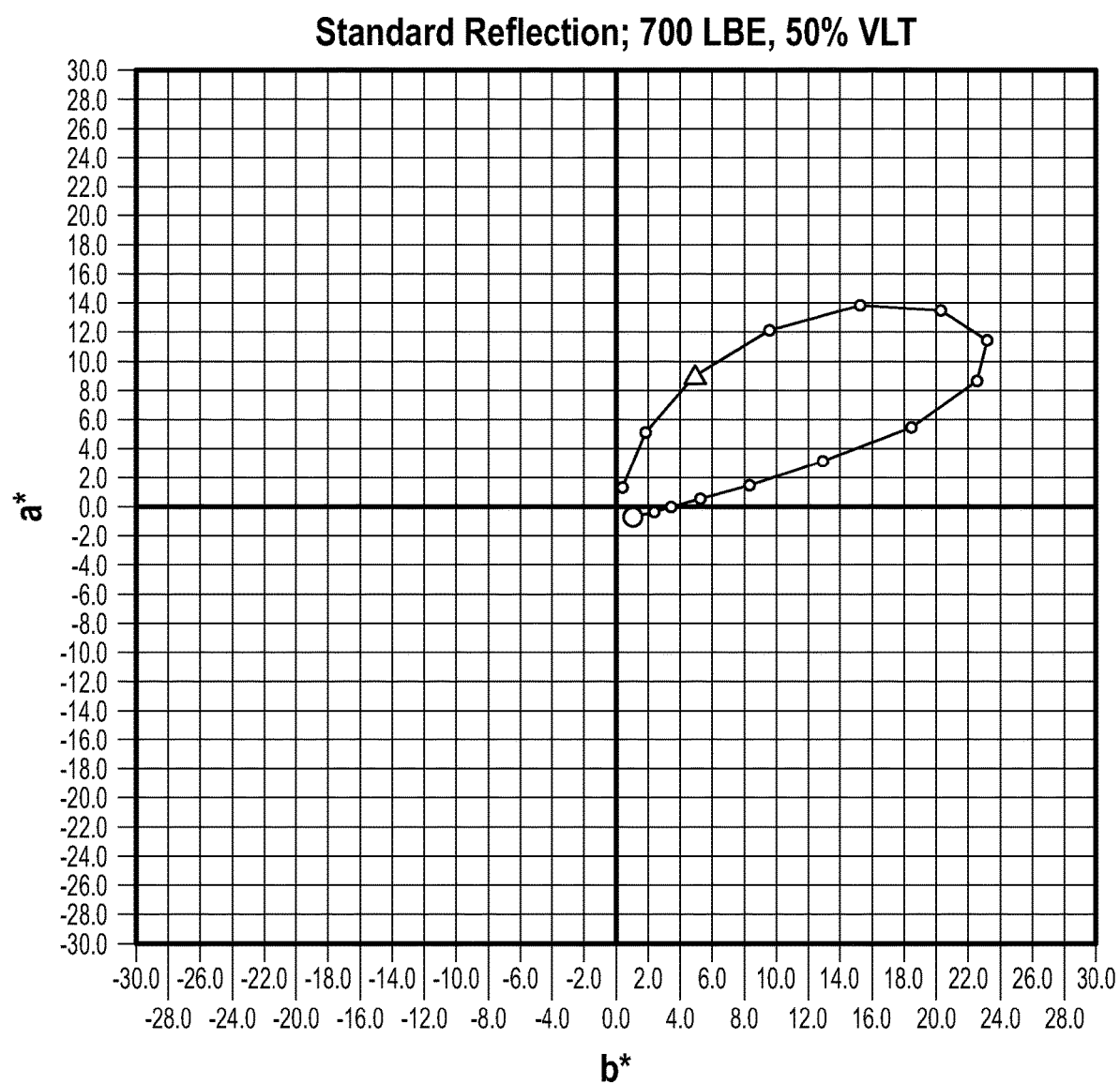
FIG. 16 is a graph showing a*b* reflected color from 0 to 85 degrees in 5 degree increments for a modeled 700 nm left bandedge infrared reflector, with a 50% VLT absorbing layer, under standard reflection conditions.
Figure 17:
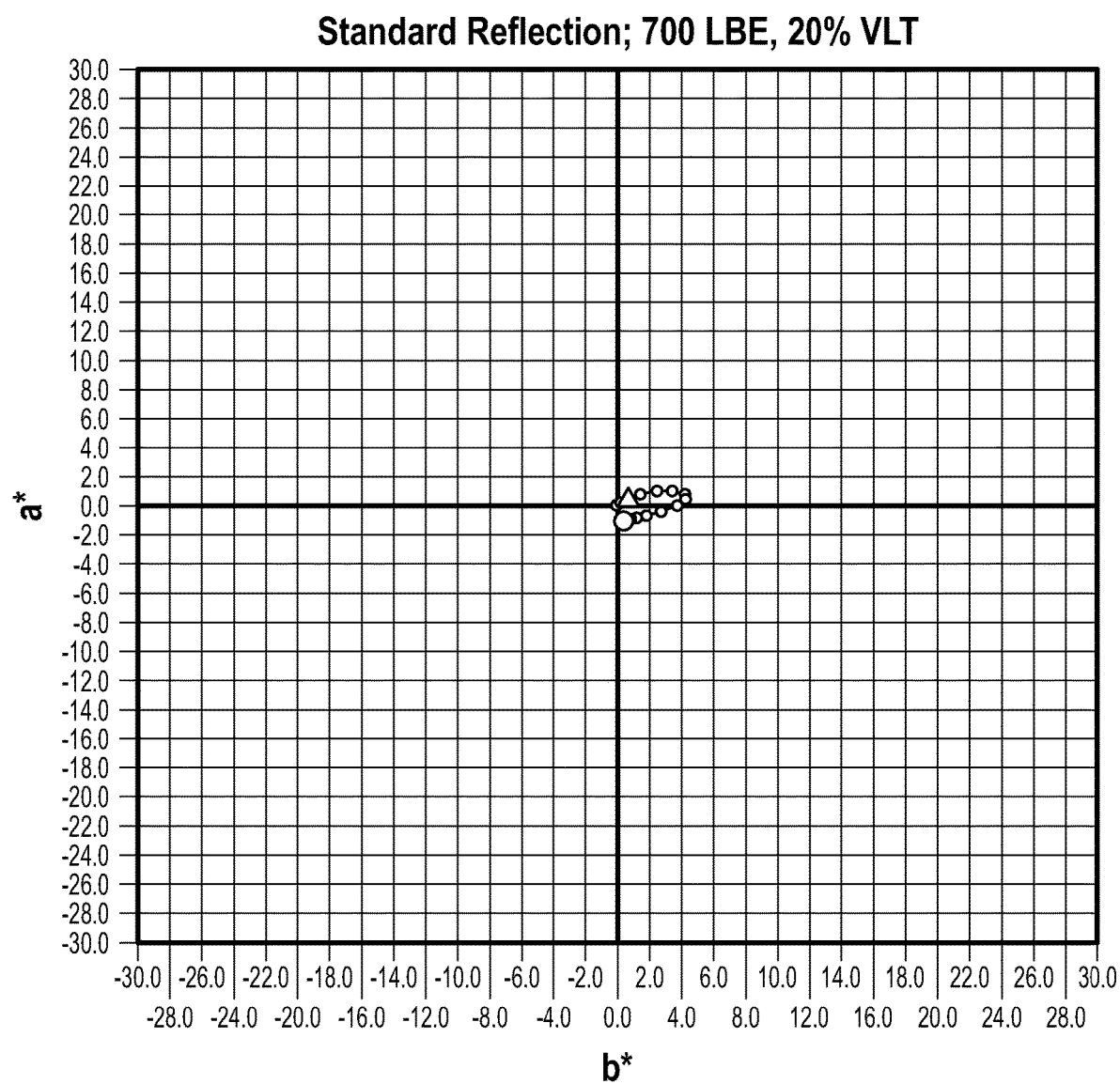
FIG. 17 is a graph showing a*b* reflected color from 0 to 85 degrees in 5 degree increments for a modeled 700 nm left bandedge infrared reflector, with a 20% VLT absorbing layer, under standard reflection conditions.
Figure 18:
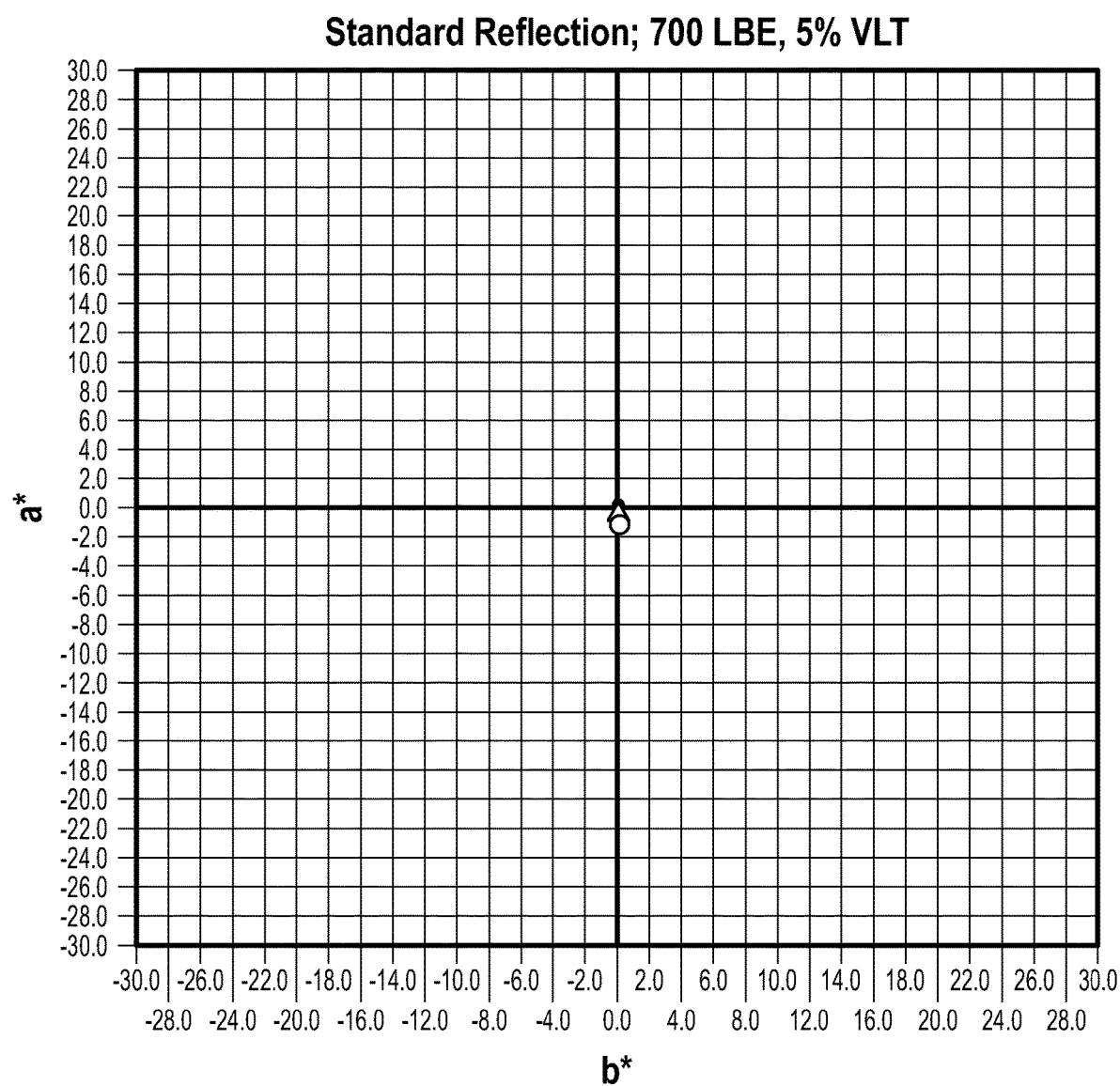
FIG. 18 is a graph showing a*b* reflected color from 0 to 85 degrees in 5 degree increments for a modeled 700 nm left bandedge infrared reflector, with a 5% VLT absorbing layer, under standard reflection conditions.
Figure 19:
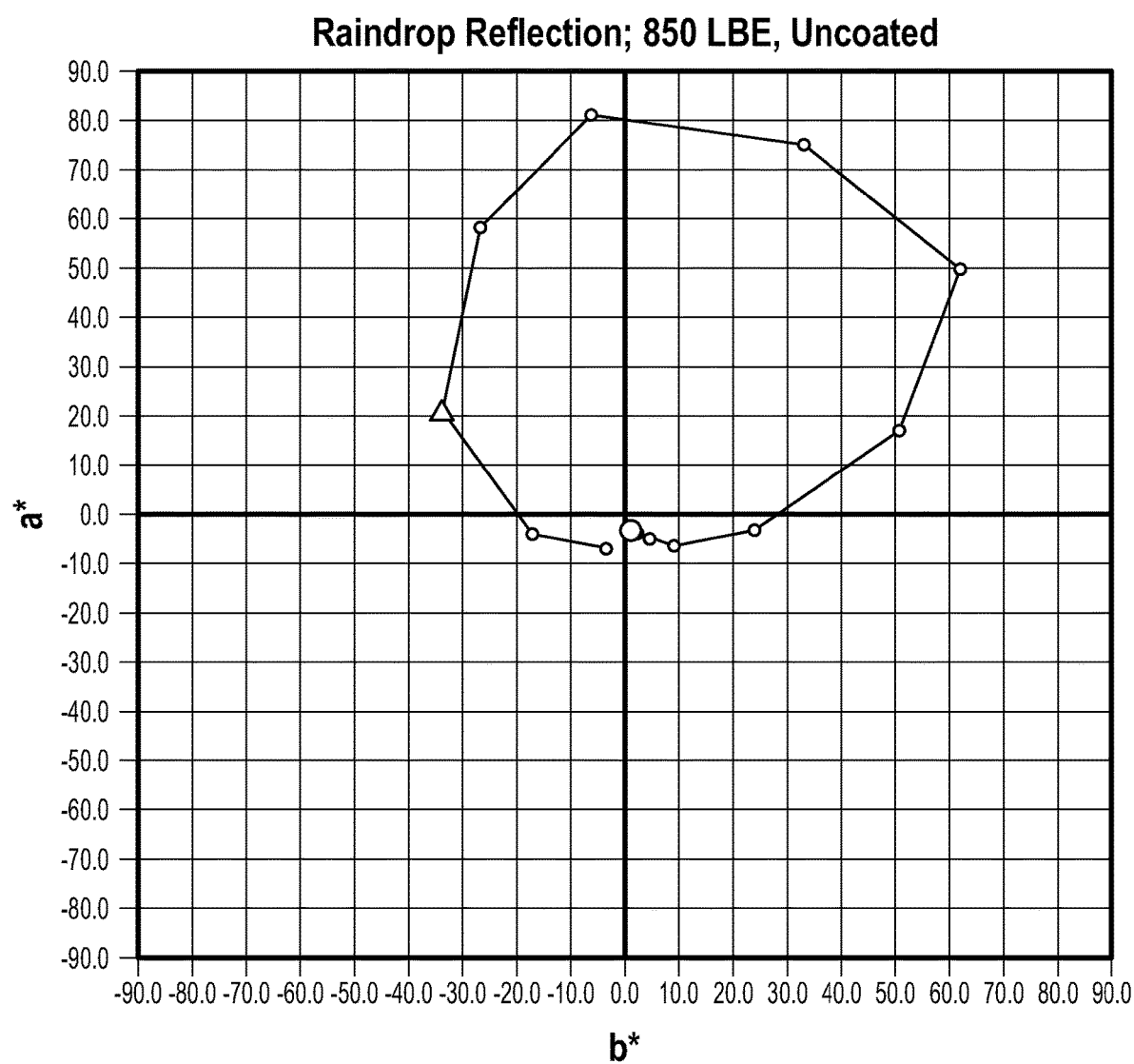
FIG. 19 is a graph showing a*b* reflected color from 0 to 85 degrees in 5 degree increments for a modeled 850 nm left bandedge infrared reflector, uncoated, under raindrop reflection conditions.
Figure 20:
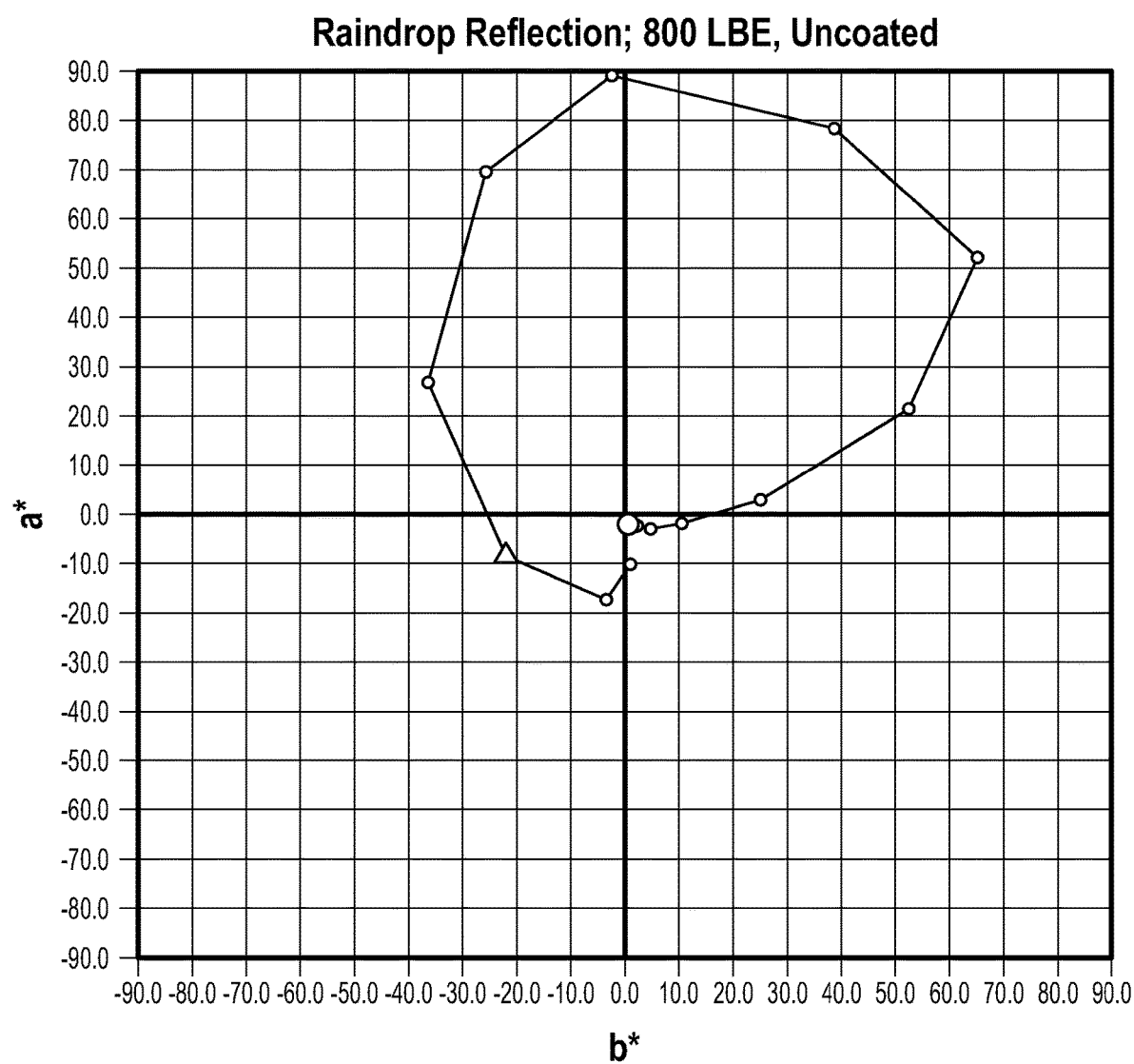
FIG. 20 is a graph showing a*b* reflected color from 0 to 85 degrees in 5 degree increments for a modeled 800 nm left bandedge infrared reflector, uncoated, under raindrop reflection conditions.
Figure 21:
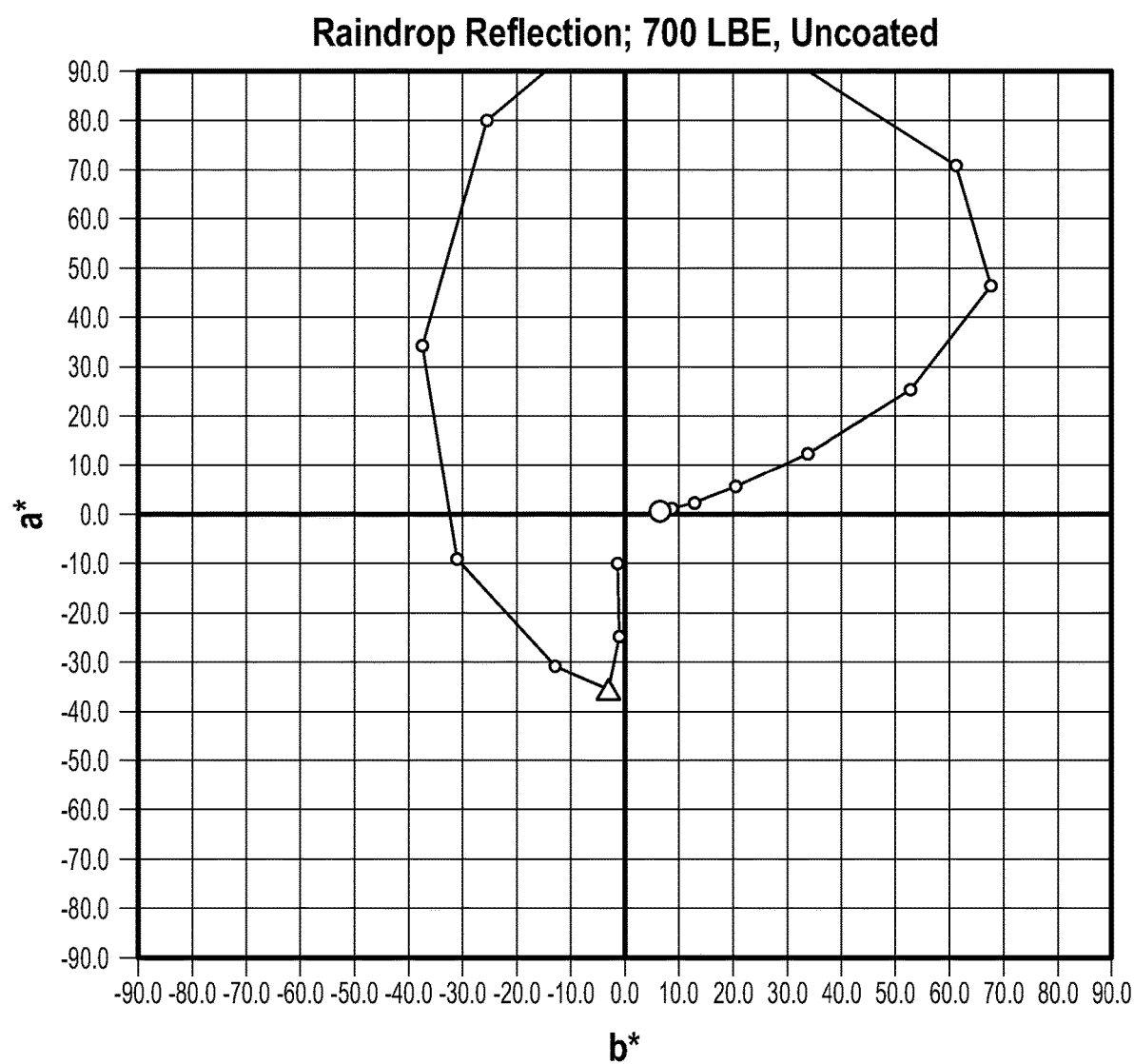
FIG. 21 is a graph showing a*b* reflected color from 0 to 85 degrees in 5 degree increments for a modeled 700 nm left bandedge infrared reflector, uncoated, under raindrop reflection conditions.
Figure 22:
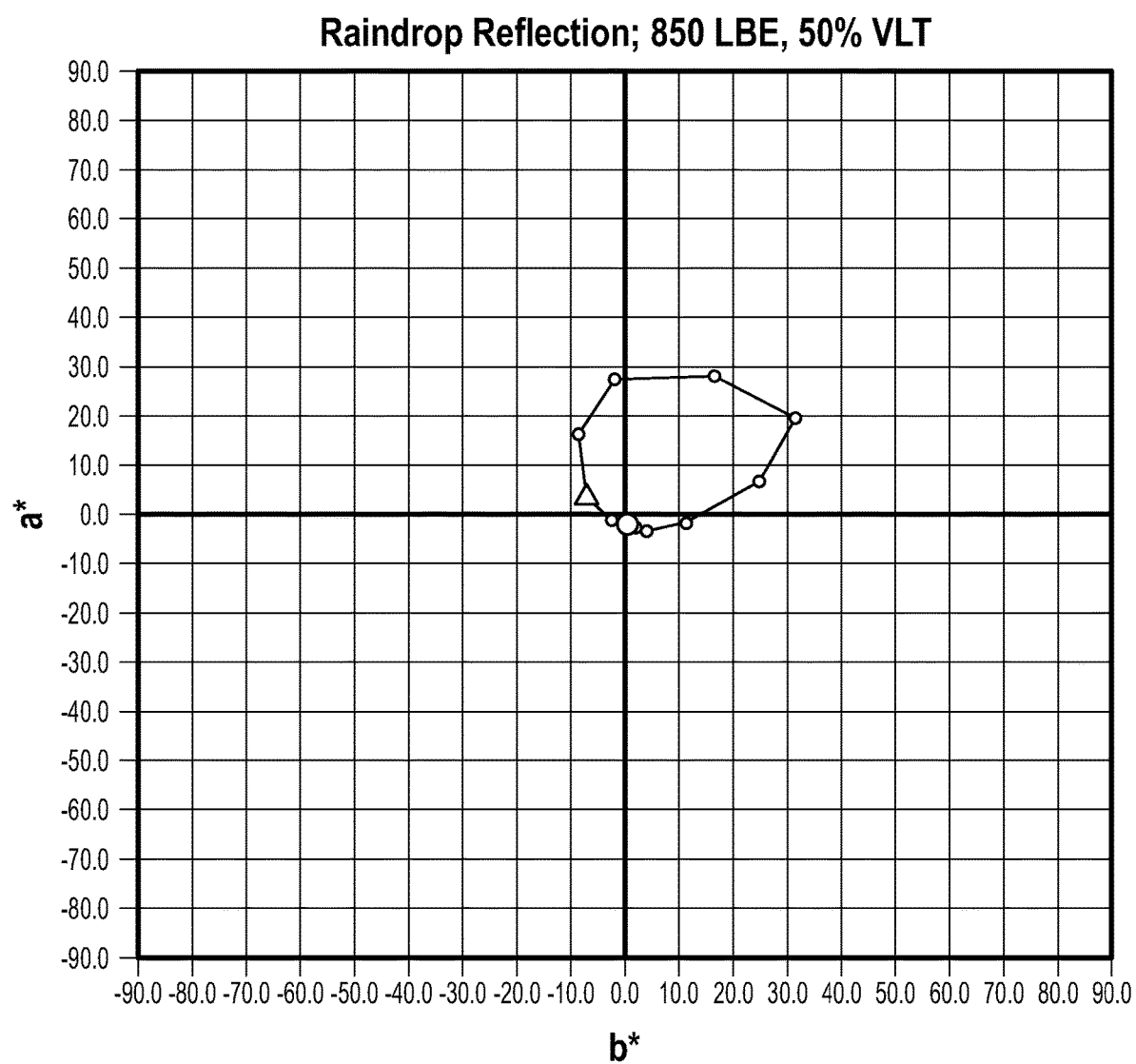
FIG. 22 is a graph showing a*b* reflected color from 0 to 85 degrees in 5 degree increments for a modeled 850 nm left bandedge infrared reflector, with a 50% VLT absorbing layer, under raindrop reflection conditions.
Figure 23:
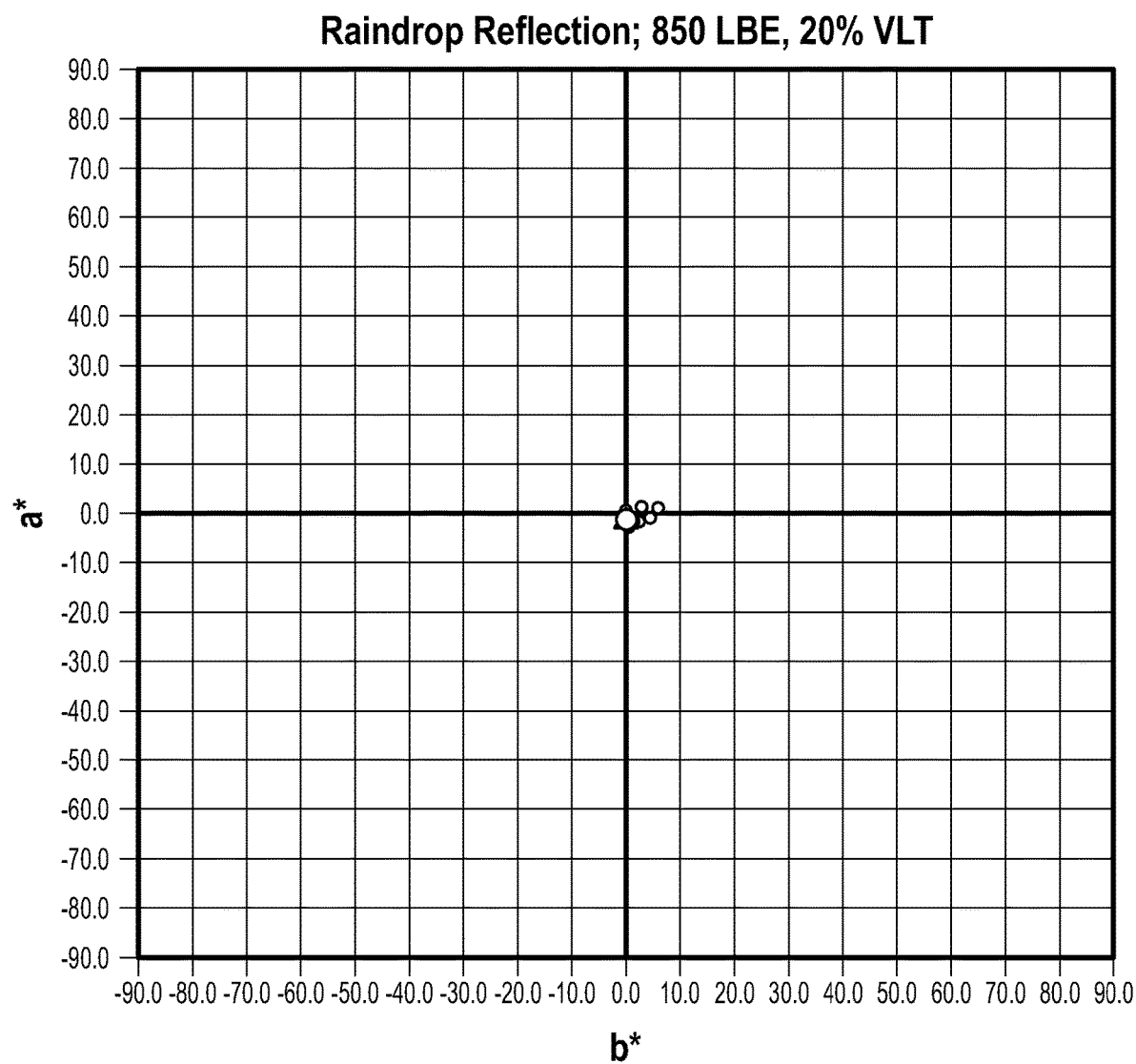
FIG. 23 is a graph showing a*b* reflected color from 0 to 85 degrees in 5 degree increments for a modeled 850 nm left bandedge infrared reflector, with a 20% VLT absorbing layer, under raindrop reflection conditions.
Figure 24:
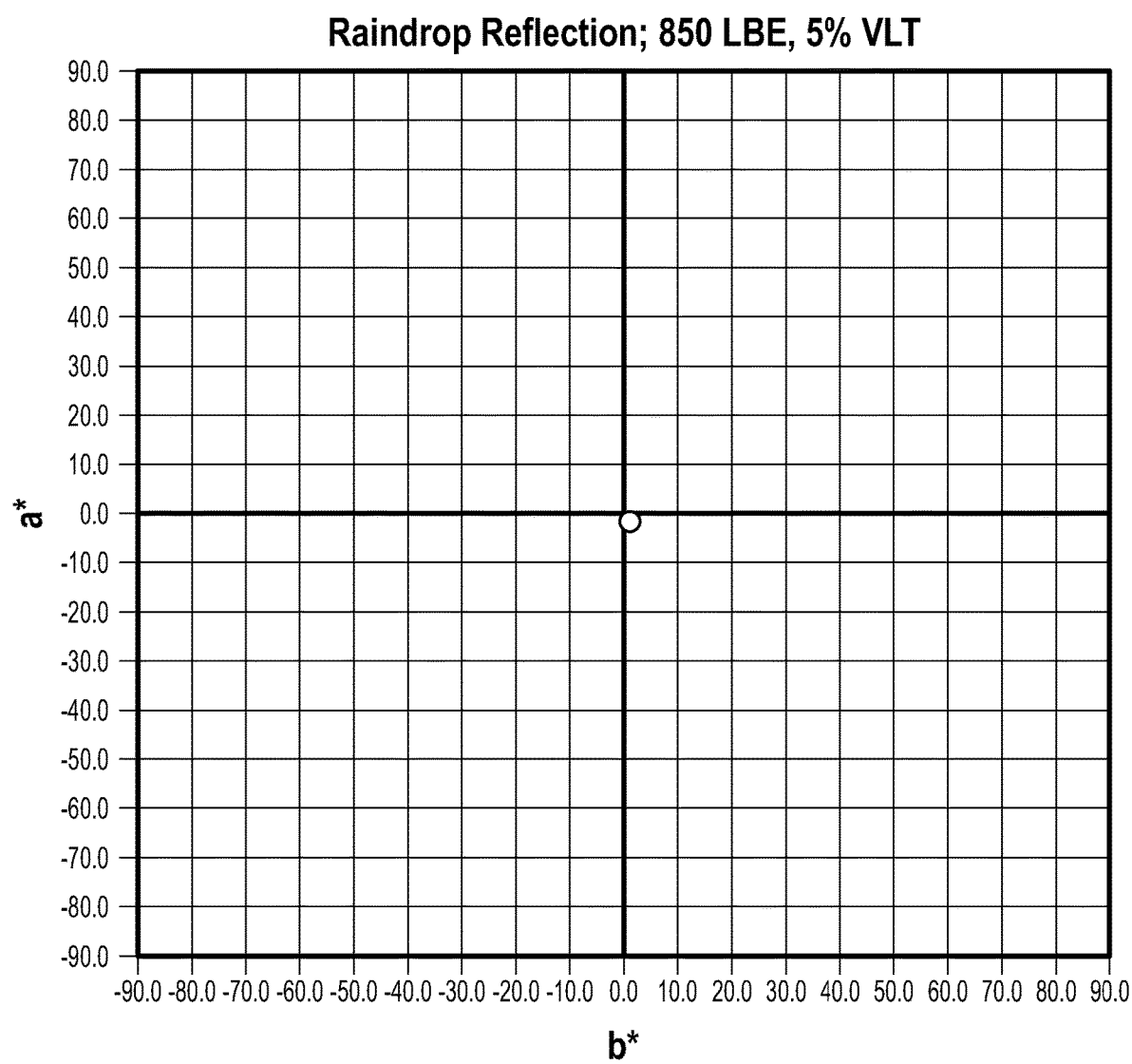
FIG. 24 is a graph showing a*b* reflected color from 0 to 85 degrees in 5 degree increments for a modeled 850 nm left bandedge infrared reflector, with a 5% VLT absorbing layer, under raindrop reflection conditions.
Figure 25:
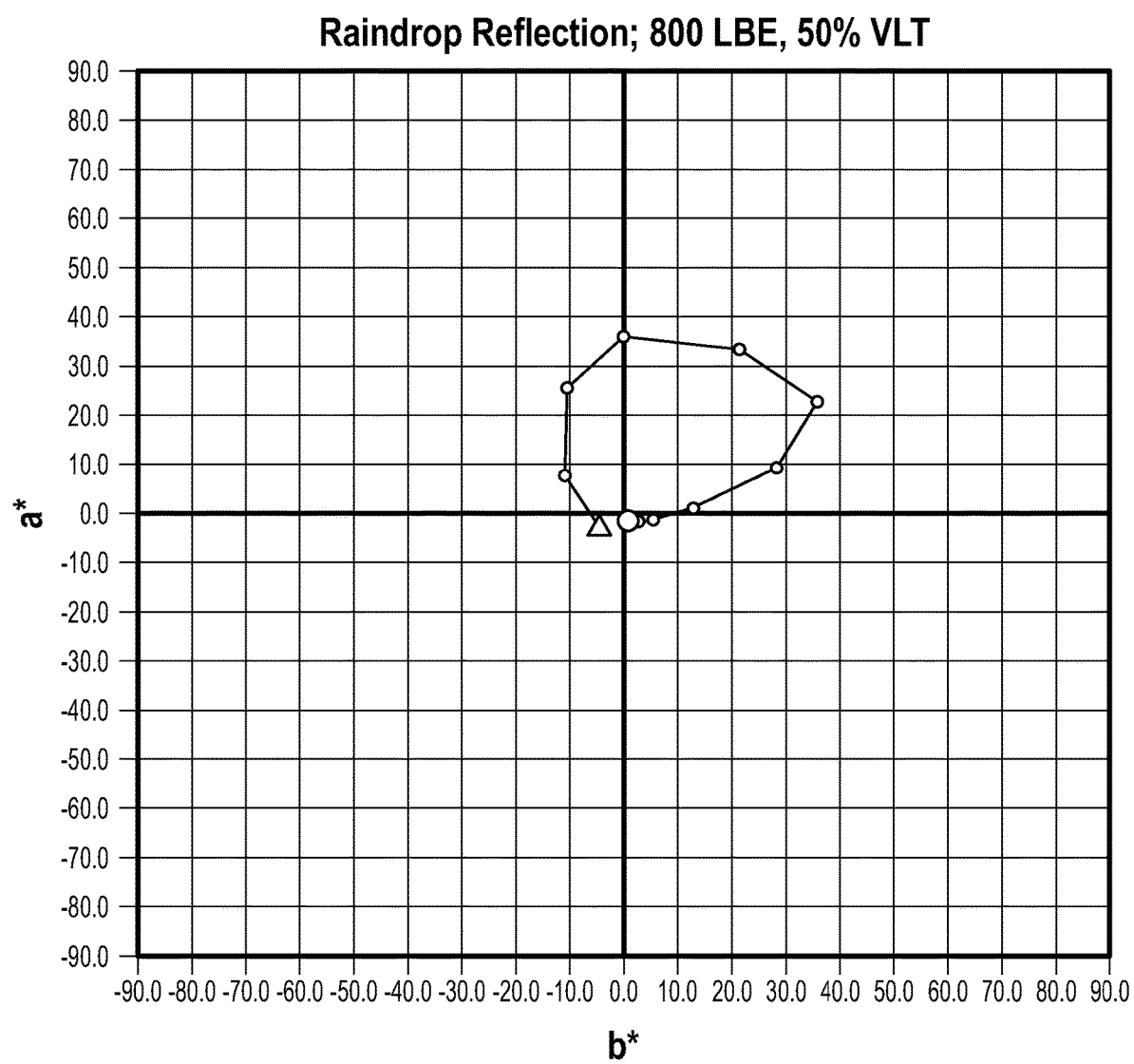
FIG. 25 is a graph showing a*b* reflected color from 0 to 85 degrees in 5 degree increments for a modeled 800 nm left bandedge infrared reflector, with a 50% VLT absorbing layer, under raindrop reflection conditions.
Figure 26:
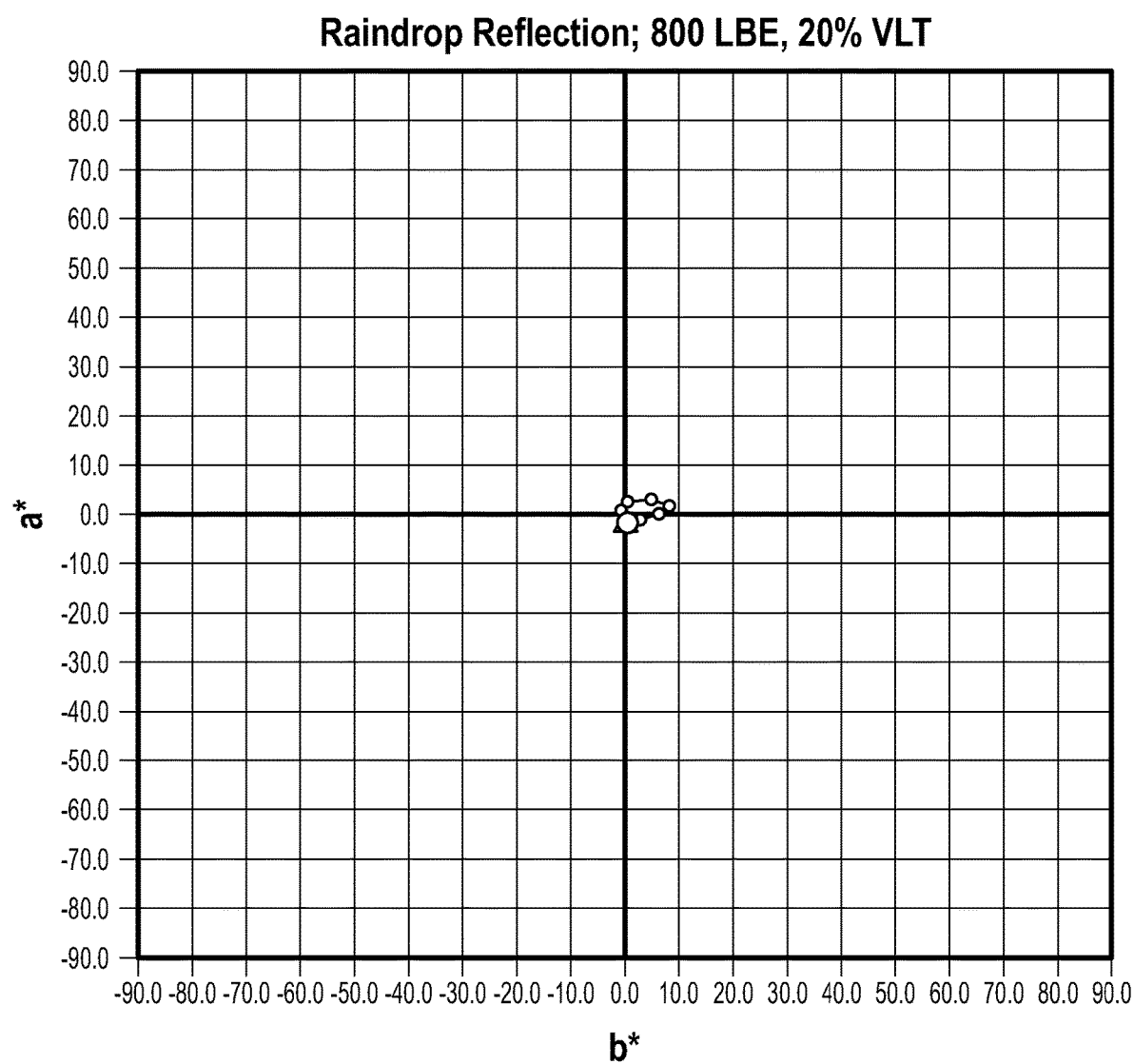
FIG. 26 is a graph showing a*b* reflected color from 0 to 85 degrees in 5 degree increments for a modeled 800 nm left bandedge infrared reflector, with a 20% VLT absorbing layer, under raindrop reflection conditions.
Figure 27:
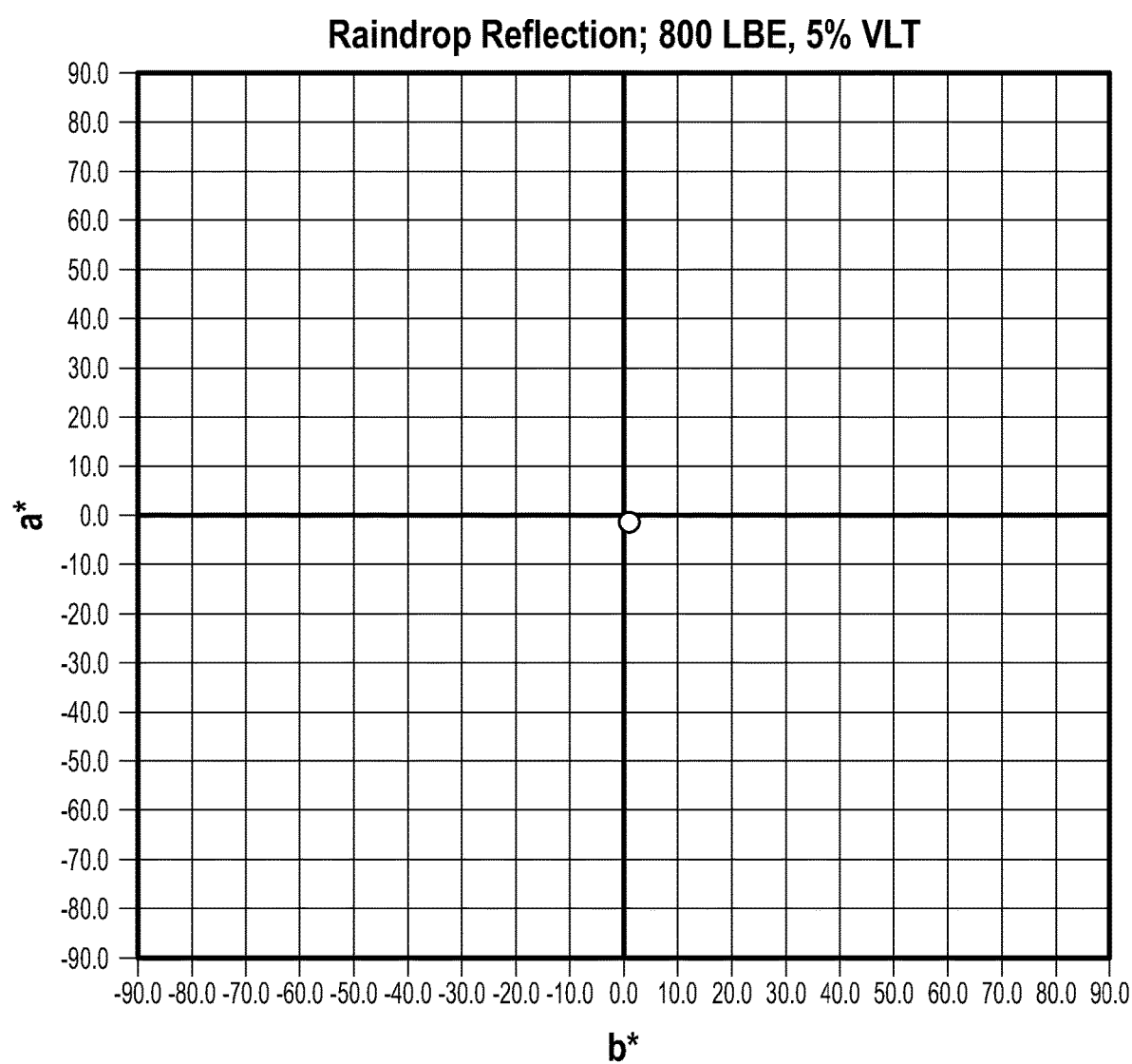
FIG. 27 is a graph showing a*b* reflected color from 0 to 85 degrees in 5 degree increments for a modeled 800 nm left bandedge infrared reflector, with a 5% VLT absorbing layer, under raindrop reflection conditions.
Figure 28:
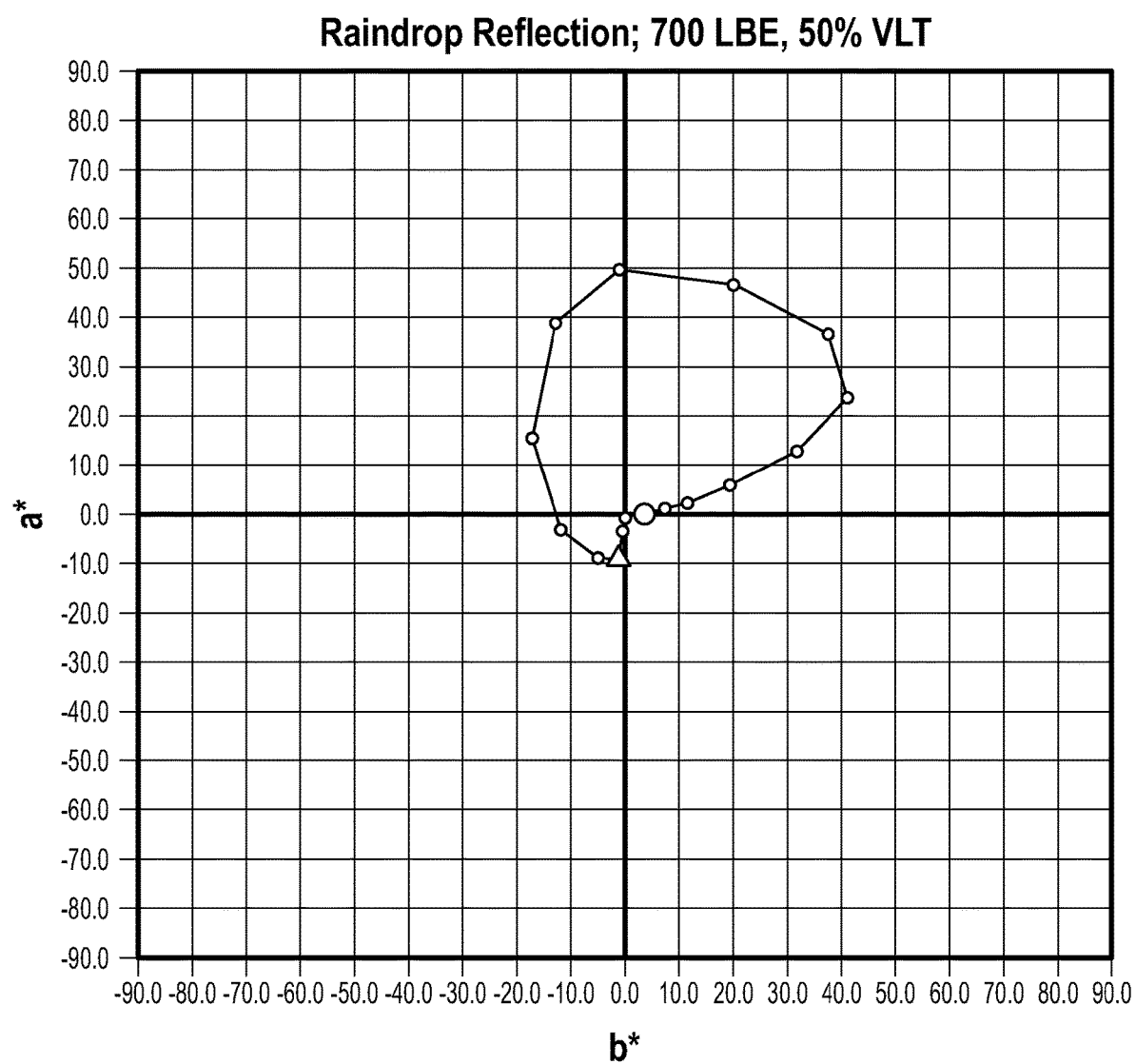
FIG. 28 is a graph showing a*b* reflected color from 0 to 85 degrees in 5 degree increments for a modeled 700 nm left bandedge infrared reflector, with a 50% VLT absorbing layer, under raindrop reflection conditions.
Figure 29:
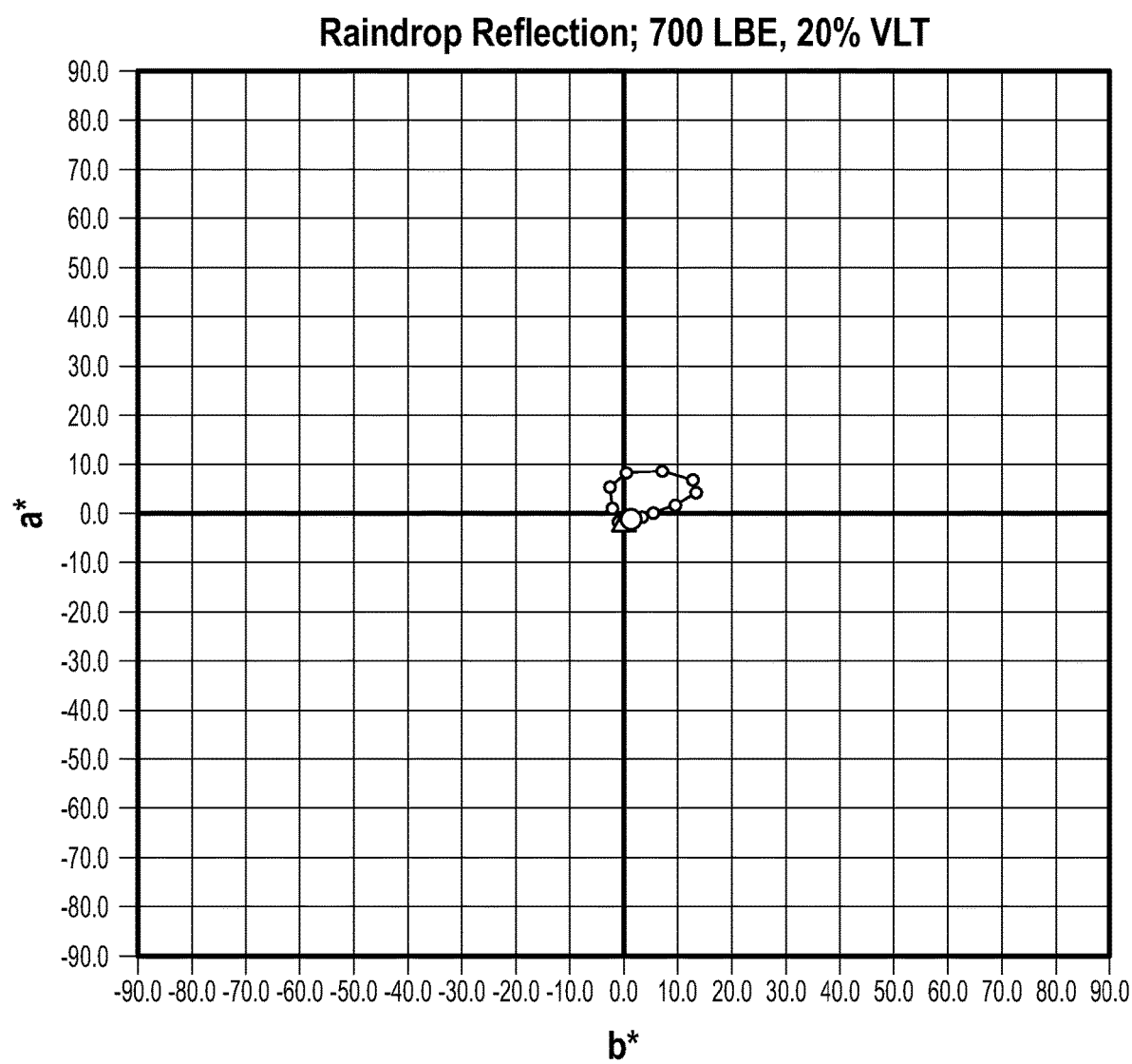
FIG. 29 is a graph showing a*b* reflected color from 0 to 85 degrees in 5 degree increments for a modeled 700 nm left bandedge infrared reflector, with a 20% VLT absorbing layer, under raindrop reflection conditions.
Figure 30:
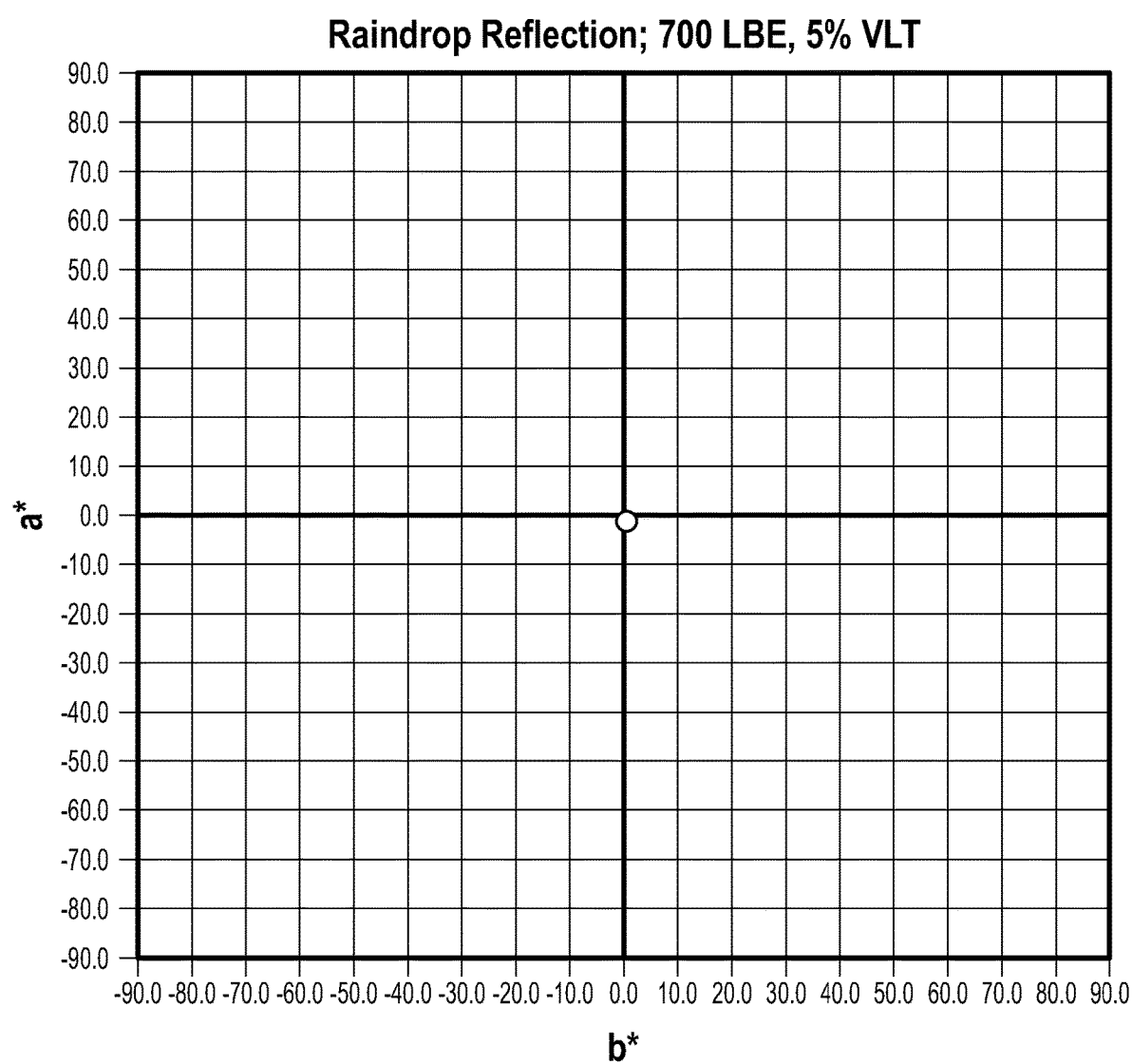
FIG. 30 is a graph showing a*b* reflected color from 0 to 85 degrees in 5 degree increments for a modeled 700 nm left bandedge infrared reflector, with a 5% VLT absorbing layer, under raindrop reflection conditions.

| Example | Left band-edge | Right band-edge | Tint (VLT %) | Reflection Spectra (Modeled) Figure #/ Maximum Color Shift | Reflection Spectra with Hemispherical Coupling (Modeled) Figure #/ Maximum Color Shift | Reduction in maximum color shift % as compared to CEX | Reduction in maximum color shift % as compared to CEX Hemispherical Coupling |
|---|---|---|---|---|---|---|---|
| CE1 | 850 | 1160 | None | FIG. 7/5.28 | FIG. 19/99.54 | N/A | N/A |
| CE2 | 800 | 1160 | None | FIG. 8/19.86 | FIG. 20/106.41 | N/A | N/A |
| CE3 | 700 | 1160 | None | FIG. 9/57.92 | FIG. 21/134.52 | N/A | N/A |
| EX1 | 850 | 1160 | MnFeO2, 50% | FIG. 10/1.61 | FIG. 22/41.6 | 69.5 | 58.2 |
| EX2 | 850 | 1160 | MnFeO2, 20% | FIG. 11/1.14 | FIG. 23/6.19 | 78.4 | 93.8 |
| EX3 | 850 | 1160 | MnFeO2, 5% | FIG. 12/1.15 | FIG. 24/0.96 | 78.2 | 99.0 |
| EX4 | 800 | 1160 | MnFeO2, 50% | FIG. 13/6.13 | FIG. 25/48.87 | 69.1 | 54.1 |
| EX5 | 800 | 1160 | MnFeO2, 20% | FIG. 14/1.17 | FIG. 26/8.91 | 94.1 | 91.6 |
| EX6 | 800 | 1160 | MnFeO2, 5% | FIG. 15/1.16 | FIG. 27/1.05 | 94.2 | 99.0 |
| EX7 | 700 | 1160 | MnFeO2, 50% | FIG. 16/25.2 | FIG. 28/62.36 | 56.5 | 53.6 |
| EX8 | 700 | 1160 | MnFeO2, 20% | FIG. 17/4.2 | FIG. 29/15.82 | 92.7 | 88.2 |
| EX9 | 700 | 1160 | MnFeO2, 5% | FIG. 18/1.05 | FIG. 30/1.21 | 97.3 | 99.1 |

Highly Colored Infrared Reflectors

Multilayer film was made, and a protective coating and adhesive were applied to opposite sides of the film. The resulting film was tested for on-axis and off-axis performance.

Materials

| Abbreviation | Description |
|---|---|
| F2 | Film 2 was a multilayer optical film (MOF) consisting of 224 alternating layers of PET and co-PMMA.. At normal incidence, Film 2 has an average reflectivity of 90.9% over a bandwidth of 680-860 nm at normal angles to the film. This gives Film 2 a neutral color in reflection and transmission at normal angles. At a 50 degree angle, Film 2 has an average reflectivity of 94.6% over a bandwidth of 590-750 nm. This gives Film 2 a reddish appearance in reflection and a cyan appearance in transmission. The film was made using the process described in US7632568 Column 9, Row 60 and Column 10, Row 50. |
| F6 | Sun Control Window Film Ceramic Series CM30 (3M Company, St Paul, MN) |
| F7 | Sun Control Window Film Night Vision Series NV35 (3M Company, St Paul, MN) |
| M2 | 50:50 blend of hexanediol diacrylate and pentaerythritol triacrylate monomers (Trade names SR238, SR295, Sartomer USA, LLC, Exton, PA) |
| PH1 | Irgacure 184 photoinitiator (BASF Corporation, Florham Park, NJ) |
| PH2 | Irgacure 819 photoinitiator (BASF Corporation, Florham Park, NJ) |
| P2 | Pigment-Carbon black nanoparticles (Carbon Black RS N/C Paste, Penn Color Inc., Doylestown, PA) |
| R1 | Acrylic pressure sensitive adhesive comprised of 94 parts isooctyl acrylate and 6 parts acrylamide, such as described in patent U.S. Pat. No.4,751,087. |
| R2 | Acrylic resin (Trade Name Aroset 1860 Z45, Valvoline Company, Lexington, KY) |
| A1 | Uvinul 3050 (BASF Corp, Florham Park, NJ) |
| A2 | Tinuvin 123 (BASF Corp, Florham Park, NJ) |
| A3 | Tinuvin 477 (CIBA Corp., Tarrytown, NY) |

Test Methods

On-Axis and Off-Axis Optical Measurements

The optical data was generated by applying the adhesive-coated side of the sample to 3 mm clear, soda-lime float glass. These laminates were then measured for transmission and reflection spectra using a Perkin Elmer Lambda 950 UV/VIS Spectrometer. In order to acquire reflected spectra at various angles, the Universal Reflectance Accessory (URA) module was installed. Spectral data were than analyzed with the Optics 5 and Windows 5 software packages from Lawrence Berkeley National Labs.

Visible Light Transmission (VLT) indicates the darkness of the film when looking through it. Visible Light Reflectance (VLR), which indicates the percent of incident light that a viewer will see reflected back at them. All VLR measurements were taken with the film samples mounted on 3 mm thick, soda-lime float glass. Measurements were made with the detector at 8° from the angle of incident light and at 50° from the angle of incident light in order to characterize how visual properties change with viewing angle.

TABLE 3

Components of the Highly Colored Infrared Reflector Examples

| Example # | Multilayer Film | Protective Coating (Monomer) | Coating Nano-pigment | Coating nano-pigment loading (% of Monomer) | Target On-Axis VLT |
|---|---|---|---|---|---|
| EX10 | F2 | M2 | P2 | 40% | 30% |

TABLE 4

Comparative Examples

| Example # | Film |
|---|---|
| CE4 | F6 |
| CE5 | F7 |

A protective coating was applied to one side of the multilayer film. The coating was acrylate monomers blended with nanopigments and photoinitiators sensitive to ultraviolet (UV) light. M2 diluted to 40% solids in a 40:60 blend of MEK and 1-methoxy-2-propanol with two photoinitiators, PH1 and PH2 each added at 1% of monomer weight. As shown in Table 1, the base formulation was blended with absorptive nanoparticles (Nano-pigments, P2). The coating for the example was applied using a precision extrusion die and coating thickness was varied in order to obtain a target transmission (Target On-Axis VLT of Table 3). The coating was applied to the moving substrate by extrusion die coating, followed by convection drying to solidify the coating layer by driving out the carrier solvents. Then the coating was cured by exposing them to UV radiation under a Fusion UV Systems Inc. Model I600M UV-curing station with a 600 W/in H-bulb operated with nitrogen purging.

An optically-clear pressure sensitive adhesive (PSA) was applied to the coated multilayer film on the opposite side of the protective coating to enable the coated multilayer film to be affixed to the glass. The PSA used was a blend of 25 parts of a soft acrylate polymer R1 to 75 parts of a stiffer acrylic resin R2. These resins were diluted to 24% total solids in a blend of solvents (8% isopropyl alcohol/39% ethyl acetate/40% toluene/1% MEK/8% heptane/4% methyl hexane) designed to keep the resins in a homogeneous solution at a viscosity to allow coatability. In addition, absorbers and stabilizers were added: A1 at 0.5 wt %, A2 at 0.2 wt %, and A3 at 1.8 wt %. The PSA was applied to the moving substrate by extrusion die coating, followed by convection drying to solidify the coating layer by driving out the carrier solvents. The PSA coating was applied at a dry thickness between 9 and 10 micrometers.

Results

TABLE 5

Comparison of the on-axis and off-axis appearance

| Example # | Reflective Material | VLT @ 8° | Exterior VLR @ 8° | VLT @ 50° | Exterior VLR @ 50° | Ratio of VLR @ 50° to 8° |
|---|---|---|---|---|---|---|
| EX10 | PET/Co-PMMA | 34% | 6.1% | 24% | 22% | 352% |
| CE4 | Titanium Nitride | 38% | 16% | 35% | 12% | 74% |
| CE5 | Aluminum | 38% | 13% | 34% | 11% | 82% |

What is claimed is:

1. An infrared reflecting film, comprising:
    a multilayer optical core having a plurality of optical repeat units, each optical repeat unit including a first birefringent polymer layer and a second polymer layer; and
    a visible absorbing layer disposed adjacent a major surface of the multilayer optical core, the visible absorbing layer not being an adhesive layer;
    wherein the plurality of optical repeat units each have an optical thickness;
    wherein the optical thicknesses of the plurality of optical repeat units are configured such that the plurality of optical repeat units exhibits a reflection band having a left bandedge and a right bandedge;
    wherein the reflection band shifts as a function of incidence angle, and produces a maximum color shift, the maximum color shift being the largest distance, ignoring lightness, between two points in an L*a*b* color space, of reflected color, over a range of incidence angles from 0 to 85 degrees measured at 5 degree increments;
    wherein, at a 60 degree angle of incidence, the left bandedge is at or below 750 nm; and
    wherein the maximum color shift with and through the visible absorbing layer is reduced by at least 25% compared with the maximum color shift without the visible absorbing layer.

2. The infrared reflecting film of claim 1, wherein the left bandedge at 0 degrees incidence is less than 850 nm.

3. The infrared reflecting film of claim 1, wherein the first birefringent polymer is polyethylene terephthalate or a copolymer thereof.

4. The infrared reflecting film of claim 1, wherein the second polymer is poly(methyl methacrylate) or a copolymer thereof.

5. A laminate, comprising:
    the infrared reflecting film of claim 1;
    a glass layer; and
    an optically clear adhesive layer;
    wherein the infrared reflecting film is attached to the glass layer by the optically clear adhesive layer.

6. The laminate of claim 5, further comprising a second glass layer and a second optically clear adhesive layer; wherein the infrared reflecting film is attached to the second glass layer by the second optically clear adhesive layer.

7. The infrared reflecting film of claim 1, wherein the absorbing layer includes a material that absorbs light in the range of 400-800 nm more than light in the range of 800-1200 nm, averaged over those spectral ranges.

8. The infrared reflecting film of claim 1, wherein the absorbing layer includes a transparent metal oxide.

9. The infrared reflecting film of claim 1, wherein the absorbing layer includes carbon black.

10. The infrared reflecting film of claim 1, wherein the absorbing layer includes at least two different absorbing materials.

11. The infrared reflecting film of claim 1, wherein the visible absorbing layer is a polymeric film layer laminated to the multilayer optical core.

12. The infrared reflecting film of claim 1, wherein the visible absorbing layer is a skin layer coextruded in the multilayer optical core.

13. The infrared reflecting film of claim 1, further comprising a second absorbing layer adjacent a second major surface of the multilayer optical core.

14. The infrared reflecting film of claim 13, wherein the first absorbing layer and the second absorbing layer have different visible light transmissions.

15. The infrared reflecting film of claim 13, wherein the first absorbing layer and the second absorbing layer have the same visible light transmissions.

16. An infrared reflecting film, comprising:
- a multilayer optical core having a plurality of optical repeat units, each optical repeat unit including a first birefringent polymer layer and a second polymer layer; and
- a visible absorbing layer disposed adjacent a major surface of the multilayer optical core, the visible absorbing layer not being an adhesive layer;
- wherein the plurality of optical repeat units each have an optical thickness;
- wherein the optical thicknesses of the plurality of optical repeat units are configured such that the plurality of optical repeat units exhibits a reflection band having a left bandedge and a right bandedge;
- wherein the reflection band shifts as a function of incidence angle;
- wherein, at a 60 degree angle of incidence, the left bandedge is at or below 750 nm; and
- wherein the ratio of the visible light reflection from 400 nm to 700 nm at 50° angle of incidence versus 8° angle of incidence is at least 150%.

17. The infrared reflecting film of claim 16, wherein the ratio of visible light reflection from 400 nm to 700 nm at 50° angle of incidence versus 8° angle of incidence is at least 200%.

18. The infrared reflecting film of claim 16, wherein the ratio of visible light reflection from 400 nm to 700 nm at 50° angle of incidence versus 8° angle of incidence is at least 300%.

19. The infrared reflecting film of claim 16, wherein the visible absorbing layer includes carbon black.

20. A window having an interior surface and an exterior surface, and comprising the infrared reflecting film of claim 16, wherein the visible absorbing layer of the infrared reflecting film faces the interior surface.

* * * * *